United States Patent
Li et al.

(10) Patent No.: US 11,979,759 B2
(45) Date of Patent: May 7, 2024

(54) USER EQUIPMENT (UE) MEASUREMENT CAPABILITY IN HIGH SPEED SCENARIOS

(71) Applicant: Apple Inc., Cupertino, CA (US)

(72) Inventors: Qiming Li, Beijing (CN); Yuhan Zhou, Austin, TX (US); Jie Cui, Santa Clara, CA (US); Yang Tang, San Jose, CA (US); Shuang Tian, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 17/439,202

(22) PCT Filed: Mar. 27, 2020

(86) PCT No.: PCT/US2020/025312
§ 371 (c)(1),
(2) Date: Sep. 14, 2021

(87) PCT Pub. No.: WO2020/205549
PCT Pub. Date: Oct. 8, 2020

(65) Prior Publication Data
US 2022/0240110 A1 Jul. 28, 2022

Related U.S. Application Data

(60) Provisional application No. 62/826,950, filed on Mar. 29, 2019.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS 10,820,248 B2 * 10/2020 Gao ................ H04W 36/00837
11,395,202 B2 * 7/2022 Tsuboi .................. H04W 36/16
2021/0120513 A1 * 4/2021 Siomina ................ H04W 64/00

FOREIGN PATENT DOCUMENTS

CN 107567718 1/2018
WO WO 2017/173303 10/2017

OTHER PUBLICATIONS

[No Author Listed], "3rd Generation Partnership Project; Technical Specification Group Radio Access Network; Evolved Universal Terrestrial Radio Access (E-UTRA); Physical layer procedures (Release 15)," 3GPP TS 36.213 V 15.4.0, Dec. 2018, 550 pages.

(Continued)

*Primary Examiner* — Brian S Roberts
(74) *Attorney, Agent, or Firm* — Fish & Richardson P.C.

(57) ABSTRACT

In a communication system comprising user equipment (UE) and a radio access network (RAN) comprising a plurality of cells is configured for receiving, by the UE, a radio resource control (RRC) information element (IE) indicating a high speed scenario (HST); and monitoring, by the UE in response to receiving the RRC IE indicating HST, a first number of frequency carriers that is reduced relative to a second number of frequency carriers monitored by the UE during a non-HST.

18 Claims, 12 Drawing Sheets

(56) References Cited

OTHER PUBLICATIONS

[No Author Listed], "3rd Generation Partnership Project; Technical Specification Group Radio Access Network; Evolved Universal Terrestrial Radio Access (E-UTRA); User Equipment (UE) procedures in idle mode (Release 15)," 3GPP TS 36.304 V15.2.0, Dec. 2018, 55 pages.

[No Author Listed], "3rd Generation Partnership Project; Technical Specification Group Radio Access Network; Evolved Universal Terrestrial Radio Access (E-UTRA); Multiplexing and channel coding (Release 15)," 3GPP TS 36.212 V15.4.0, Dec. 2018, 247 pages.

[No Author Listed], "3rd Generation Partnership Project; Technical Specification Group Radio Access Network; Evolved Universal Terrestrial Radio Access (E-UTRA); Physical channels and modulation (Release 15)," 3GPP TS 36.211 V15.4.0 , Dec. 2018, 240 pages.

[No Author Listed], "3rd Generation Partnership Project; Technical Specification Group Radio Access Network; Evolved Universal Terrestrial Radio Access (E-UTRA); Requirements for support of radio resource management (Release 16)," 3GPP TS 36.133 V16.0.0, Dec. 2018, 596 pages.

[No Author Listed], "3rd Generation Partnership Project; Technical Specification Group Radio Access Network; Evolved Universal Terrestrial Radio Access (E-UTRA); User Equipment (UE) radio access capabilities (Release 15)," 3GPP TS 36.306 V15.3.0, Dec. 2019, 114 pages.

[No Author Listed], "3rd Generation Partnership Project; Technical Specification Group Radio Access Network; Evolved Universal Terrestrial Radio Access (E-UTRA); User Equipment (UE) radio transmission and reception (Release 16), " 3GPP TS 36.101, V 16.0.0, Dec. 2018, 1821 pages.

[No Author Listed], "3rd Generation Partnership Project; Technical Specification Group Radio Access Network; NR; Physical channels and modulation (Release 15)," 3GPP TS 38.211 V15.4.0, Dec. 2018, 96 pages.

[No Author Listed], "3rd Generation Partnership Project; Technical Specification Group Radio Access Network; NR; Physical layer measurements (Release 15)," 3GPP TS 38.215 V15.4.0, Dec. 2018, 15 pages.

[No Author Listed], "3rd Generation Partnership Project; Technical Specification Group Radio Access Network; NR; Physical layer procedures for control (Release 15)," 3GPP TS 38.213 V15.4.0, Dec. 2018, 104 pages.

[No Author Listed], "3rd Generation Partnership Project; Technical Specification Group Radio Access Network; NR; Radio Resource Control (RRC) protocol specification (Release 15)," 3GPP TS 38.331 V15.4.0, Dec. 2018, 474 pages.

[No Author Listed], "3rd Generation Partnership Project; Technical Specification Group Radio Access Network; NR; Requirements for support of radio resource management (Release 15)," 3GPP TS 38.133 V15.4.0, Dec. 2018, 876 pages.

Ericsson, "Introduction of enhanced measurements for high speed train for Scells," 3GPP Draft TSG-RAN WG4 Meeting #90, R4-1900937, Athens, Greece, Feb. 25-Mar. 1, 2019, 4 pages.

Ericsson, "Motivation for enhancements to UMTS and LTE increased UE carrier monitoring," 3GPP Draft; RP-160781, RAM #72, Busan, Korea, Jun. 13-16, 2016, 6 pages.

Intel Corporation, "Discussion on the network assistant signaling for enhanced RRM requirements in HST," 3GPP TSG-RAN WG4 Meeting #81, R4-1609076, Reno, Nevada, USA, Nov. 14-18, 2016, 2 pages.

International Preliminary Report on Patentability in International Appln. No. PCT/US2020/025312, dated Oct. 14, 2021, 10 pages.

International Search Report and Written Opinion in International Appln. No. PCT/US2020/025312, dated Jul. 9, 2020, 18 pages.

\* cited by examiner

USER EQUIPMENT (UE) MEASUREMENT CAPABILITY IN HIGH SPEED SCENARIOS

CROSS-REFERENCE TO RELATED APPLICATION

This disclosure is a U.S. National Phase Application under 35 U.S.C. § 371 and claims the benefit of priority to International Application No. PCT/US2020/025312, filed Mar. 27, 2020, which claims the benefit of the priority of U.S. Provisional Patent Application No. 62/826,950, entitled "USER EQUIPMENT (UE) MEASUREMENT CAPABILITY IN HIGH SPEED SCENARIOS" and filed on Mar. 29, 2019. The above-identified application is incorporated herein by reference in its entirety.

TECHNICAL FIELD

This disclosure relates generally to wireless communication systems.

BACKGROUND

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Generally, in a telecommunications system, User Equipment (UE)s may need to monitor many cells and frequency layers of the telecommunications system. However, for High Speed Scenario (HST), particularly in high-speed dedicated network deployment, a UE does not need to monitor so many cells and frequency layers. However, to support high speed mobility performance, Radio Resource Management (RRM) under HST is enhanced in comparison with legacy scenarios. Enhancing RMM generally causes extra power consumption by the UE. Therefore, it is beneficial to reduce RMM requirements when operating under HST. The systems and methods described herein are configured to cause UEs to monitor a reduced number of frequency carriers when operating under HST.

These and other implementations can include one or more of the following features. In a communication system including user equipment (UE) and a radio access network (RAN) including a plurality of cells, a process includes receiving, by the UE, a radio resource control (RRC) information element (IE) indicating a high speed scenario (HST). The process includes monitoring, by the UE in response to receiving the RRC IE indicating HST, a first number of frequency carriers that is reduced relative to a second number of frequency carriers monitored by the UE during a non-HST.

In some implementations, monitoring the first number of frequency carriers includes configuring the UE for increased UE carrier monitoring for Evolved Universal Mobile Telecommunications System (UMTS) Terrestrial Radio Access Network (E-UTRA) monitoring, monitoring, by the UE, any of between 0 and 8 Frequency Division Duplex (FDD) E-UTRA inter-frequency carriers, and monitoring, by the UE, any of between 0 and 8 Time Division Duplex (TDD) E-UTRA inter-frequency carriers.

In some implementations, monitoring the first number of frequency carriers includes configuring the UE for increased UE carrier monitoring for Universal Mobile Telecommunications System (UMTS) Terrestrial Radio Access Network (UTRA) monitoring, monitoring, by the UE, any of between 0 and 6 Frequency Division Duplex (FDD) UTRA carriers, and monitoring, by the UE, any of between 0 and 7 Time Division Duplex (TDD) UTRA carriers.

In some implementations, monitoring the first number of frequency carriers includes configuring the UE to be in an RRC_CONNECTED state, determining that no measurement gaps of the UE are activated, and in response to determining that no measurement gaps of the UE are activated, measuring, by the UE, each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

In some implementations, monitoring the first number of frequency carriers includes measuring, by the UE, each of Reference Signal Received Power (RSRP), Reference Signal Received Quality (RSRQ), and Reference Signal based Signal to Noise and Interference Ratio (RS-SINR) for any of between 0 and 8 identified cells of the plurality of cells, where each of the RSRP, RSRQ, and RS-SINR are measured on a secondary component carrier.

In some implementations, monitoring the first number of frequency carriers includes configuring the UE for increased UE carrier monitoring for E-UTRA monitoring, and measuring, by the UE, each of RSRP, RSRQ, and RS-SINR of at least between 0 to 4 inter-frequency cells per FDD inter-frequency for any of between 0 and 8 FDD inter-frequencies.

In some implementations, monitoring the first number of frequency carriers includes determining that the UE does not support Increased UE carrier monitoring E-UTRA, and measuring, by the UE, each of RSRP, RSRQ, and RS-SINR of at least between 0 to 4 inter-frequency cells per FDD inter-frequency for any of between 0 and 4 FDD inter-frequencies.

In some implementations, the UE is configured by a next generation (gNB) node of the RAN by the RRC Reconfiguration IE. In some implementations, the RRC IE comprises one of a highSpeedEnhancedMeasFlag or Secondary Component Carrier (SCC) measurementEnhancements for indicating HST. In some implementations, the process includes configuring the UE to identify new intra-frequency cells and perform RSRP, RSRQ, and RS-SINR measurements of identified intra-frequency cells without an explicit intra-frequency neighbor cell list containing physical layer cell identities; and configuring the UE to measure, during an RRC_CONNECTED state, identified intra frequency cells and additionally search for and identify the new intra frequency cells.

In an aspect, an apparatus includes one or more processors; a transceiver; and a memory storing instructions that, when executed by the one or more processors, cause the one or more processors to perform operations including the following. The operations include receiving, by the transceiver, from a radio access network (RAN) including a plurality of cells, a radio resource control (RRC) information element (IE) indicating a high speed scenario (HST). The operations include monitoring, by the one or more processors through the transceiver, in response to receiving the RRC IE indicating HST, a first number of frequency carriers that is reduced relative to a second number of frequency carriers monitored during a non-HST.

In some implementations, monitoring the first number of frequency carriers includes configuring the one or more processors to perform increased UE carrier monitoring for Evolved Universal Mobile Telecommunications System (UMTS) Terrestrial Radio Access Network (E-UTRA) monitoring, monitoring, by the one or more processors using the transceiver, any of between 0 and 8 Frequency Division Duplex (FDD) E-UTRA inter-frequency carriers, and monitoring, by the one or more processors using the transceiver, any of between 0 and 8 Time Division Duplex (TDD) E-UTRA inter-frequency carriers.

In some implementations, monitoring the first number of frequency carriers includes configuring the one or more processors to perform increased UE carrier monitoring for Universal Mobile Telecommunications System (UMTS) Terrestrial Radio Access Network (UTRA) monitoring; monitoring, by the one or more processors using the transceiver, any of between 0 and 6 Frequency Division Duplex (FDD) UTRA carriers; and monitoring, by the one or more processors using the transceiver, any of between 0 and 7 Time Division Duplex (TDD) UTRA carriers.

In some implementations, monitoring the first number of frequency carriers includes configuring the one or more processors to be in an RRC_CONNECTED state; determining that no measurement gaps for the transceiver and the one or more processors are activated; and in response to determining that no measurement gaps are activated, measuring, by the one or more processors using the transceiver, each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

In some implementations, monitoring the first number of frequency carriers includes measuring, by the one or more processors using the transceiver, each of Reference Signal Received Power (RSRP), Reference Signal Received Quality (RSRQ), and Reference Signal based Signal to Noise and Interference Ratio (RS-SINR) for any of between 0 and 8 identified cells of the plurality of cells, where each of the RSRP, RSRQ, and RS-SINR are measured on a secondary component carrier.

In some implementations, monitoring the first number of frequency carriers comprises: configuring the one or more processors for increased UE carrier monitoring for E-UTRA monitoring; measuring, by the one or more processors using the transceiver, each of RSRP, RSRQ, and RS-SINR of at least between 0 to 4 inter-frequency cells per FDD inter-frequency for any of between 0 and 8 FDD inter-frequencies.

In some implementations, monitoring the first number of frequency carriers comprises: determining that the one or more processors or transceiver does not support Increased UE carrier monitoring E-UTRA; and measuring, by the one or more processors using the transceiver, each of RSRP, RSRQ, and RS-SINR of at least between 0 to 4 inter-frequency cells per FDD inter-frequency for any of between 0 and 4 FDD inter-frequencies.

In some implementations, the one or more processors are configured by a next generation (gNB) node of the RAN by the RRC Reconfiguration IE. The RRC IE comprises one of a highSpeedEnhancedMeasFlag or Secondary Component Carrier (SCC) measurementEnhancements for indicating HST.

In some implementations, the operations further including: configuring the one or more processors to identify new intra-frequency cells and perform RSRP, RSRQ, and RS-SINR measurements of identified intra-frequency cells without an explicit intra-frequency neighbor cell list containing physical layer cell identities; and configuring the one or more processors to measure, during an RRC_CONNECTED state, measure identified intra frequency cells and additionally search for and identify the new intra frequency cells.

In some implementations, one or more non-transitory computer readable media store instructions that, when executed by one or more processors, cause the one or more processors to perform operations comprising: receiving, from a radio access network (RAN) including a plurality of cells, a radio resource control (RRC) information element (IE) indicating a high speed scenario (HST); and monitoring, by the one or more processors, in response to receiving the RRC IE indicating HST, a first number of frequency carriers that is reduced relative to a second number of frequency carriers monitored during a non-HST.

In an aspect, monitoring the first number of frequency carriers includes configuring the one or more processors to perform increased UE carrier monitoring for Evolved Universal Mobile Telecommunications System (UMTS) Terrestrial Radio Access Network (E-UTRA) monitoring, monitoring, by the one or more processors using the transceiver, any of between 0 and 8 Frequency Division Duplex (FDD) E-UTRA inter-frequency carriers, and monitoring, by the one or more processors using the transceiver, any of between 0 and 8 Time Division Duplex (TDD) E-UTRA inter-frequency carriers.

In some implementations, monitoring the first number of frequency carriers includes configuring the one or more processors to perform increased UE carrier monitoring for Universal Mobile Telecommunications System (UMTS) Terrestrial Radio Access Network (UTRA) monitoring; monitoring, by the one or more processors using the transceiver, any of between 0 and 6 Frequency Division Duplex (FDD) UTRA carriers; and monitoring, by the one or more processors using the transceiver, any of between 0 and 7 Time Division Duplex (TDD) UTRA carriers.

In some implementations, monitoring the first number of frequency carriers includes configuring the one or more processors to be in an RRC_CONNECTED state; determining that no measurement gaps for the transceiver and the one or more processors are activated; and in response to determining that no measurement gaps are activated, measuring, by the one or more processors using the transceiver, each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

In some implementations, monitoring the first number of frequency carriers includes measuring, by the one or more processors using the transceiver, each of Reference Signal Received Power (RSRP), Reference Signal Received Quality (RSRQ), and Reference Signal based Signal to Noise and Interference Ratio (RS-SINR) for any of between 0 and 8 identified cells of the plurality of cells, where each of the RSRP, RSRQ, and RS-SINR are measured on a secondary component carrier.

In some implementations, monitoring the first number of frequency carriers comprises: configuring the one or more processors for increased UE carrier monitoring for E-UTRA monitoring; measuring, by the one or more processors using the transceiver, each of RSRP, RSRQ, and RS-SINR of at least between 0 to 4 inter-frequency cells per FDD inter-frequency for any of between 0 and 8 FDD inter-frequencies.

In some implementations, monitoring the first number of frequency carriers comprises: determining that the one or more processors or transceiver does not support Increased UE carrier monitoring E-UTRA; and measuring, by the one or more processors using the transceiver, each of RSRP, RSRQ, and RS-SINR of at least between 0 to 4 inter-frequency cells per FDD inter-frequency for any of between 0 and 4 FDD inter-frequencies.

In some implementations, the one or more processors are configured by a next generation (gNB) node of the RAN by the RCC Reconfiguration IE. The RCC IE comprises one of a highSpeedEnhancedMeasFlag or Secondary Component Carrier (SCC) measurementEnhancements for indicating HST.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Generally, in a telecommunications system, User Equipment (UE)s may need to monitor many cells and frequency layers of the telecommunications system. However, for High Speed Scenario (HST), particularly in high-speed dedicated network deployment, a UE does not need to monitor so many cells and frequency layers. However, to support high speed mobility performance, Radio Resource Management (RRM) under HST is enhanced in comparison with legacy scenarios. Enhancing RMM generally causes extra power consumption by the UE. Therefore, it is beneficial to reduce RMM requirements when operating under HST. The systems and methods described herein are configured to cause UEs to monitor a reduced number of frequency carriers when operating under HST.

Figure 1:
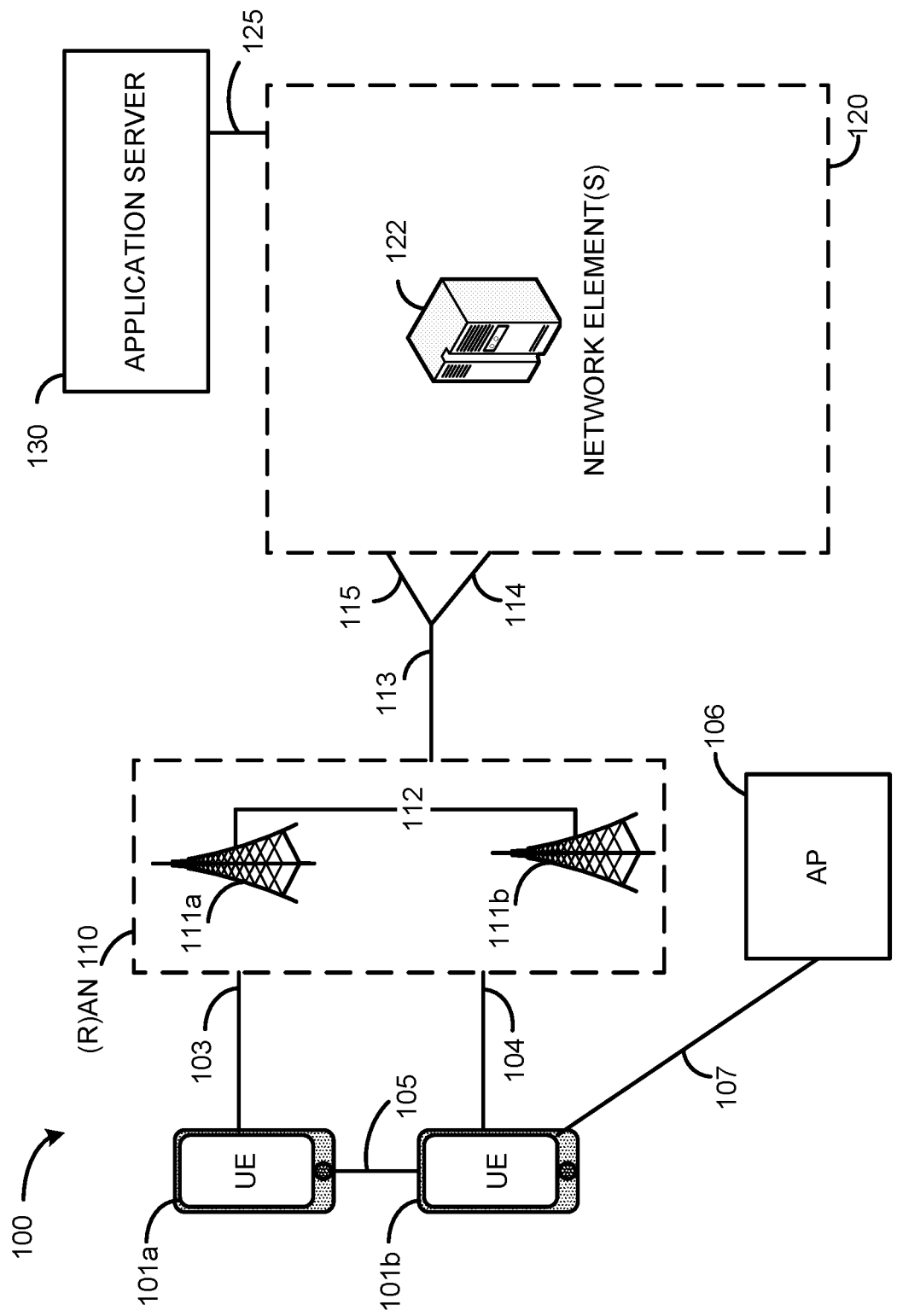
FIG. 1 illustrates an example of a wireless communication system.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (ECCA) slots, where X and Y are minimum and maximum values for the CWSs for LAA. In one example, the minimum CWS for an LAA transmission may be 9 microseconds (µs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARD) information related to the uplink shared channel. Downlink scheduling (e.g., assigning control and shared channel resource blocks to the UE 101*b* within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

Figure 2:
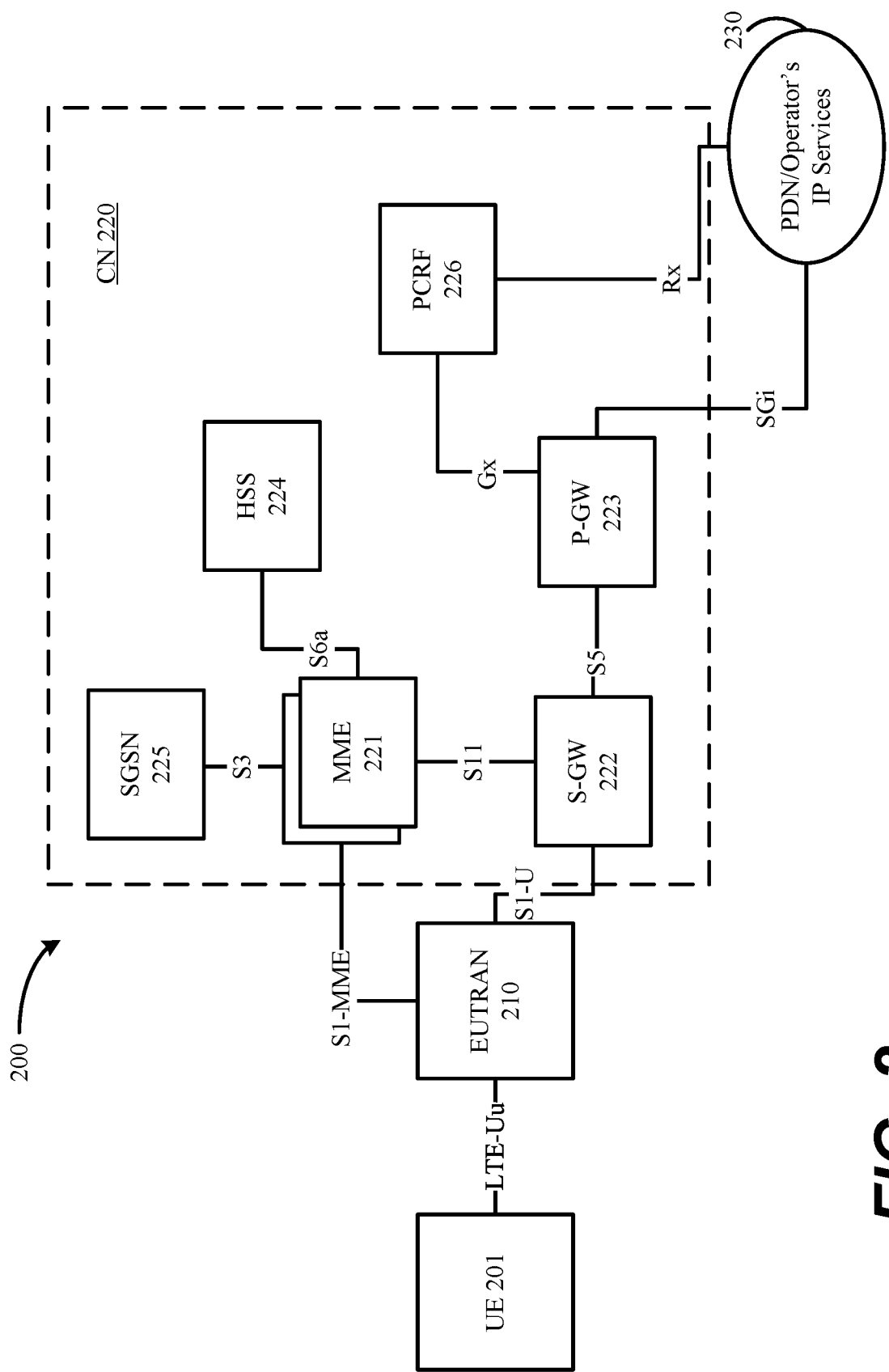
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
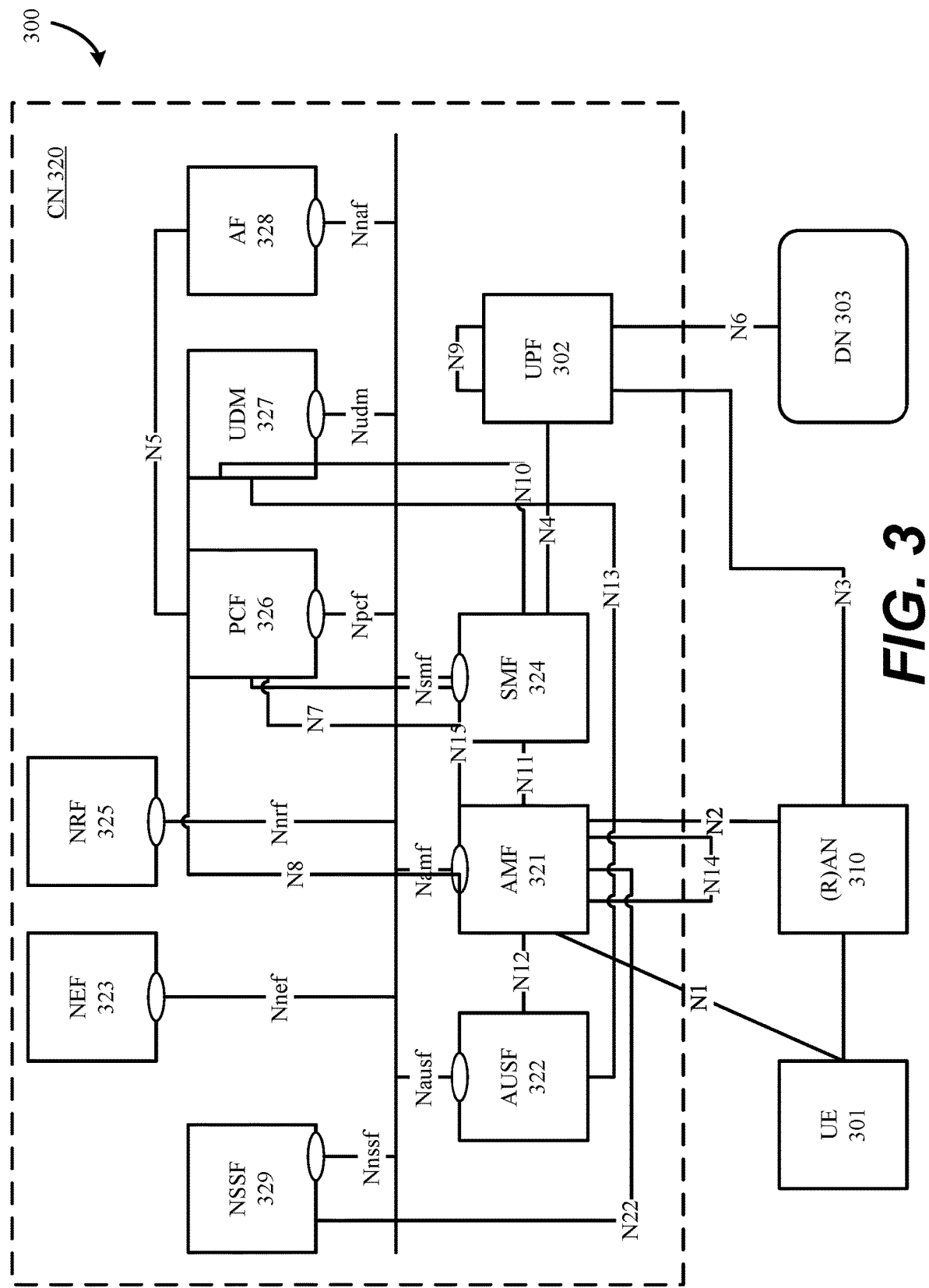
FIG. 3 illustrates another example architecture of a system including a core network.

In some examples, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

In various embodiments, a node a network (NW) (e.g., the RAN 110 and/or a RAN node 111) may configure the UE 101 in the RRC (radio resource control) connected state to perform measurements and report the measurements in accordance with a measurement configuration. The measurement configuration is provided by means of dedicated signaling, for example, using an RRC-Reconfiguration message. A node (e.g., a next generation node gNB) of the NW may configure the UE 101 to perform the following types of measurements: NR measurements, LTE measurements, and inter-RAT measurements of NR/E-UTRA/UTRA frequencies. The gNB may configure the UE 101 to report the following measurement information based on SS/PBCH block(s): measurement results per SS/PBCH block; measurement results per cell based on SS/PBCH block(s); and/or SS/PBCH block(s) indexes. The gNB may configure the UE 101 to report the following measurement information based on channel state information reference signal (CSI-RS) resources: measurement results per CSI-RS resource; measurement results per cell based on CSI-RS resource(s); and CSI-RS resource measurement identifiers.

The measurement configuration includes one or more of the following parameters: measurement objects, reporting configurations, measurement identities, quantity configurations, and measurement gaps. In an example, measurement gaps include periods that the UE 101 may use to perform measurements. Measurement objects (MOs) are a list of objects on which the UE 101 performs the measurements.

For intra-frequency and inter-frequency measurements, a measurement object indicates the frequency/time location and subcarrier spacing of reference signals to be measured. Associated with this measurement object, the gNB may configure a list of cell specific offsets, a list of 'blacklisted' cells, and a list of 'whitelisted' cells. Blacklisted cells are not applicable in event evaluation or measurement reporting. Whitelisted cells are the only ones applicable in event evaluation or measurement reporting. The measure object identifier (measObjectId) of the MO which corresponds to each serving cell is indicated by serving cell MO within the serving cell configuration. For inter-RAT E-UTRA measurements, a measurement object includes a single E-UTRA carrier frequency. Associated with this E-UTRA carrier frequency, the gNB can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

Reporting configurations include a list of reporting configurations where there can be one or multiple reporting configurations per measurement object. Each reporting configuration includes one or more of the following items described. The reporting configuration can include a reporting criterion, which is the criterion that triggers the UE to send a measurement report. This can either be periodical or a single event description. The reporting configuration includes a reference signal (RS) type, such as the RS that the UE uses for beam and cell measurement results (SS/PBCH block or CSI-RS). The reporting configuration includes a reporting format, such as the quantities per cell and per beam that the UE includes in the measurement report (e.g., RSRP). The reporting format can include other associated information such as the maximum number of cells and the maximum number beams per cell to report.

Measurement identities include a list of measurement identities where each measurement identity links one measurement object with one reporting configuration. By configuring multiple measurement identities, it is possible for the UE to link more than one measurement object to the same reporting configuration, as well as to link more than one reporting configuration to the same measurement object. The measurement identity is also included in the measurement report that triggered the reporting, serving as a reference to the network.

Quantity configurations include the quantity configuration defines the measurement filtering configuration used for all event evaluation and related reporting, and for periodical reporting of that measurement. For NR measurements, the gNB(s) may configure up to two quantity configurations with a reference in the NR measurement object and a reference to the configuration that is to be used. In each configuration, different filter coefficients can be configured for different measurement quantities, for different RS types, and for measurements per cell and per beam.

The UE 101 in the RRC connected state maintains a measurement object list, a reporting configuration list, and a measurement identities list according to signaling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells: the NR (or LTE) serving cell(s) (these are the SpCell and one or more Scells); listed cells (these are cells listed within the measurement object(s)); and detected cells (these are cells that are not listed within the measurement object(s) but are detected by the UE on the SSB frequency(ies) and subcarrier spacing(s) indicated by the measurement object(s)). For NR and/or LTE measurement object(s), the UE 101 measures and reports on the serving cell(s), listed cells and/or detected cells. For inter-RAT measurements object(s) of E-UTRA, the UE 101 measures and reports on listed cells and detected cells. Whenever the procedure refers to a field it concerns a field included in the VarMeasConfig element unless explicitly stated otherwise. In other words, only the measurement configuration procedure covers the direct UE 101 action related to the received measConfig object.

In embodiments, when the UE 101 is in the RRC_CONNECTED state, the UE 101 derives cell measurement results by measuring one or multiple beams associated per cell as configured by the gNB(s) (e.g., the RAN 110 and/or a RAN node 111), as described in 3GPP TS 38.331 section 5.5.3.3. For all cell measurement results in the RRC_CONNECTED mode, the UE 101 applies layer-3 filtering as specified in 3GPP TS 38.331 section 5.5.3.2, before using the measured results for evaluation of reporting criteria and measurement reporting. For cell measurements, the gNB(s) can configure Reference Signal Received Power (RSRP), Reference Signal Received Quality (RSRQ) or Signal to Noise and Interference Ratio (SINR) as trigger quantity. Reporting quantities can be the same as trigger quantity or combinations of quantities (e.g., RSRP and RSRQ; RSRP and SINR; RSRQ and SINR; RSRP, RSRQ and SINR).

The gNB(s) may also configure the UE 101 to report measurement information per beam (which can either be measurement results per beam with respective beam identifier(s) or only beam identifier(s)), derived as described in 3GPP TS 38.331 section 5.5.3.3a. If beam measurement information is configured to be included in measurement reports, the UE applies the layer 3 beam filtering as specified in 3GPP TS 38.331 section 5.5.3.2. On the other hand, the exact layer-1 filtering of beam measurements used to derive cell measurement results is implementation dependent. In embodiments, whenever the UE 101 has a measConfig object, the UE 101 performs RSRP and RSRQ measurements for each serving cell for which servingCellMO is configured as follows:

If at least one measId included in the measIdList within VarMeasConfig contains an rsType set to ssb: if at least one measId included in the measIdList within VarMeasConfig contains a reportQuanfityRS-Indexes and maxNrofRS-IndexesToReport and contains an rsType set to ssb, the UE 101 derives layer-3 filtered RSRP and RSRQ per beam for the serving cell based on SS/PBCH block, as described in 3GPP TS 38.331 section 5.5.3.3a. Alternatively or in addition, the UE 101 derives serving cell measurement results based on SS/PBCH block, as described in 3GPP TS 38.331 section 5.5.3.3.

If at least one measId included in the measIdList within VarMeasConfig includes an rsType set to csi-rs, and if at least one measId included in the measIdList within VarMeasConfig contains a reportQuantityRS-Indexes and maxNrofRS-IndexesToReport and contains an rsType set to csi-rs, the UE 101 derives layer-3 filtered RSRP and RSRQ per beam for the serving cell based on CSI-RS, as described in 3GPP TS 38.331 section 5.5.3.3a. Alternatively or in addition, the UE 101 derives serving cell measurement results based on CSI-RS, as described in 3GPP TS 38.331 section 5.5.3.3.

If at least one measId included in the measIdList within VarMeasConfig contains SINR as trigger quantity and/or reporting quantity, and if the associated reportConfig contains rsType set to ssb: if the measId contains a reportQuantityRS-Indexes and maxNrofRS-IndexesToReport, the UE 101 derives layer 3 filtered SINR per beam for the serving cell based on SS/PBCH block, as described in 3GPP TS 38.331 section 5.5.3.3a. Alternatively or in addition, the UE 101 derives serving cell SINR based on SS/PBCH block, as described in 3GPP TS 38.331 section 5.5.3.3.

If the associated reportConfig contains rsType set to csi-rs, and if the measId contains a reportQuantityRS-Indexes and maxNrofRS-IndexesToReport the UE 101 derives layer-3 filtered SINR per beam for the serving cell based on CSI-RS, as described in 3GPP TS 38.331 section 5.5.3.3a. Alternatively or in addition, the UE 101 derives serving cell SINR based on CSI-RS, as described in 3GPP TS 38.331 section 5.5.3.3.

For each measId included in the measIdList within VarMeasConfig, and if the reportType for the associated reportConfig is set to reportCGI, the UE 101 performs the corresponding measurements on the frequency and RAT indicated in the associated measObject using available idle periods; if the cell indicated by reportCGI field for the associated measObject is an NR cell and that indicated cell is broadcasting SIB1 (see 3GPP TS 38.213, clause 13), the UE 101 tries to acquire SIB1 in the concerned cell. Alternatively or in addition, if the cell indicated by reportCGI field is an E-UTRA cell, the UE 101 tries to acquire SystemInformationBlockType1 in the concerned cell.

If the reportType for the associated reportConfig is periodical or event Triggered, and if a measurement gap configuration is setup, or if the UE 101 does not require measurement gaps to perform the concerned measurements, and if s-MeasureConfig is not configured, or if s-MeasureConfig is set to ssb-RSRP and the NR SpCell RSRP based on SS/PBCH block, after layer 3 filtering, is lower than ssb-RSRP, or if s-MeasureConfig is set to csi-RSRP and the NR SpCell RSRP based on CSI-RS, after layer 3 filtering, is lower than csi-RSRP, and/or if the measObject is associated to NR and the rsType is set to csi-rs: if reportQuantityRS-Indexes and maxNrofRS-IndexesToReport for the associated reportConfig are configured, then the UE 101 derives layer-3 filtered beam measurements only based on CSI-RS for each measurement quantity indicated in report QuantityRS-Indexes, as described in 3GPP TS 38.331 section 5.5.3.3a. Alternatively or in addition, the UE 101 derives cell measurement results based on CSI-RS for each trigger quantity and each measurement quantity indicated in reportQuantityCell using parameters from the associated measObject, as described in 3GPP TS 38.331 section 5.5.3.3; and/or if the measObject is associated to NR and the rsType is set to ssb, and if report QuantityRS-Indexes and maxNrofRS-IndexesToReport for the associated reportConfig are configured, then the UE 101 derives layer 3 beam measurements only based on SS/PBCH block for each measurement quantity indicated in reportQuantityRS-Indexes, as described in 3GPP TS 38.331 section 5.5.3.3a; and/or the UE 101 derives cell measurement results based on SS/PBCH block for each trigger quantity and each measurement quantity indicated in reportQuantityCell using parameters from the associated measObject, as described in 3GPP TS 38.331 section 5.5.3.3; and/or if the measObject is associated to E-UTRA, the UE 101 performs the corresponding measurements associated to neighbouring cells on the frequencies indicated in the concerned measObject. Additionally, the UE 101 performs the evaluation of reporting criteria as specified in 3GPP TS 38.331 section 5.5.4.

The gNB(s) may configure the UE 101 to derive RSRP, RSRQ and SINR measurement results per cell associated to NR measurement objects based on parameters configured in the measObject (e.g., maximum number of beams to be averaged and beam consolidation thresholds) and in the reportConfig (rsType to be measured, SS/PBCH block or CSI-RS). In such embodiments, the UE 101, for each cell measurement quantity to be derived based on SS/PBCH block: if nrofSS-BlocksToAverage in the associated measObject is not configured; or if absThreshSS-Blocks-Consolidation in the associated measObject is not configured; or if the highest beam measurement quantity value is below or equal to absThreshSS-BlocksConsolidation, then the UE 101 derives each cell measurement quantity based on SS/PBCH block as the highest beam measurement quantity value, where each beam measurement quantity is described in 3GPP TS 38.215. Otherwise, the UE 101 derives each cell measurement quantity based on SS/PBCH block as the linear power scale average of the highest beam measurement quantity values above absThreshSS-BlocksConsohdation where the total number of averaged beams shall not exceed nrofSS-BlocksToAverage. Also, the UE 101 applies layer-3 cell filtering as described in 3GPP TS 38.331 section 5.5.3.2.

For each cell measurement quantity to be derived based on CSI-RS, the UE 101 considers a CSI-RS resource to be applicable for deriving cell measurements when the concerned CSI-RS resource is included in the csi-rs-CellMobility including the physCellId of the cell in the CSI-RS-ResourceConfigMobility in the associated measObject. If nrofCSI-RS-ResourcesToAverage in the associated measObject is not configured; or if absThreshCSI-RS-Consolidation in the associated measObject is not configured; or if the highest beam measurement quantity value is below or equal to absThreshCSI-RS-Consolidation, then the UE 101 derives each cell measurement quantity based on applicable CSI-RS resources for the cell as the highest beam measurement quantity value, where each beam measurement quantity is described in 3GPP TS 38.215. Otherwise, the UE 101 derives each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage. Otherwise, the UE 101 applies layer-3 cell filtering as described in 3GPP TS 38.331 section 5.5.3.2.

In some implementations, the UE 101 may perform measurements of various reference signals for various purposes. For example, the CSI-RS defined in subclause 7.4.1.5 of 3GPP TS 38.211, may be used for time/frequency tracking, CSI computation, L1-RSRP computation, and mobility. For a CSI-RS resource associated with a NZP-CSI-RS-ResourceSet with the higher layer parameter repetition set to 'on', the UE 101 does not expect to be configured with CSI-RS over the symbols during which the UE 101 is also configured to monitor the CORESET, while for other NZP-CSI-RS-ResourceSet configurations, if the UE 101 is configured with a CSI-RS resource and a search space set associated with a CORESET in the same OFDM symbol(s), the UE 101 may assume that the CSI-RS and a PDCCH DM-RS transmitted in all the search space sets associated with CORESET are quasi co-located with 'QCL-TypeD', if 'QCL-TypeD' is applicable. This also applies to the case when CSI-RS and the CORESET are in different intra-band component carriers, if 'QCL-TypeD' is applicable. Furthermore, the UE 101 does not expect to be configured with the CSI-RS in PRBs that overlap those of the CORESET in the OFDM symbols occupied by the search space set(s). The UE 101 is not expected to receive CSI-RS and [SystemInformationBlockType1] message in the overlapping PRBs in the OFDM symbols where [SystemInformationBlockType1] is transmitted. If the UE 101 is configured with DRX, the most recent CSI measurement occasion occurs in DRX active time for CSI to be reported.

The UE 101 in the RRC connected mode is expected to receive the higher layer UE specific configuration of a NZP-CSI-RS-ResourceSet configured with higher layer parameter trs-Info. For a NZP-CSI-RS-ResourceSet configured with the higher layer parameter trs-Info, the UE 101 assumes the antenna port with the same port index of the configured NZP CSI-RS resources in the NZP-CSI-RS-ResourceSet is the same. For frequency range 1, the UE 101 may be configured with one or more NZP CSI-RS set(s), where a NZP-CSI-RS-ResourceSet consists of four periodic NZP CSI-RS resources in two consecutive slots with two periodic NZP CSI-RS resources in each slot. For frequency range 2, the UE 101 may be configured with one or more NZP CSI-RS set(s), where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

When the UE 101 is configured with NZP-CSI-RS-ResourceSet(s) configured with higher layer parameter trs-Info, the UE 101 may have the CSI-RS resources configured as one of the following. The resources can be configured as periodic, with the CSI-RS resources in the NZP-CSI-RS-ResourceSet configured with same periodicity, bandwidth and subcarrier location. The resource can be configured as periodic CSI-RS resources in one set and aperiodic CSI-RS resources in a second set, with the aperiodic CSI-RS and periodic CSI-RS resource having the same bandwidth (with same RB location) and the aperiodic CSI-RS being 'QCL-Type-A' and 'QCL-Type-D', where applicable, with the periodic CSI-RS resources. For frequency range 2, the UE 101 does not expect that the scheduling offset between the last symbol of the PDCCH carrying the triggering DCI and the first symbol of the aperiodic CSI-RS resources is smaller than the UE reported ThresholdSched-Offset. The UE 101 expects that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodic Triggering-Offset indicates the triggering offset for the first slot for the first two CSI-RS resources in the set.

The UE 101 does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'. The UE 101 does not expect to be configured with a CSI-ReportConfig with the higher layer parameter reportQuantity set to other than 'none' for aperiodic NZP CSI-RS resource set configured with trs-Info. The UE 101 does not expect to be configured with a CSI-ReportConfig for periodic NZP CSI-RS resource set configured with trs-Info. The UE 101 does not expect to be configured with a NZP-CSI-RS-ResourceSet configured both with trs-Info and with repetition.

Each CSI-RS resource, defined in subclause 7.4.1.5.3 of 3GPP TS 38.211, is configured by the higher layer parameter NZP-CSI-RS-Resource with the following restrictions. First, the time-domain locations of the two CSI-RS resources in a slot, or of the four CSI-RS resources in two consecutive slots (which are the same across two consecutive slots), as defined by higher layer parameter CSI-RS-resourceMapping, is given by one of: $l \in \{4,8\}$, $l \in \{5,9\}$, or $l \in \{6,10\}$ for frequency range 1 and frequency range 2; or $l \in \{0,4\}$, $l \in \{1,5\}$, $l \in \{2,6\}$, $l \in \{3,7\}$, $l \in \{7,11\}$, $l \in \{8,12\}$, or $l \in \{9,13\}$ for frequency range 2. Second, a single port CSI-RS resource with density $\rho=3$ given by Table 7.4.1.5.3-1 from [4, TS 38.211] and a higher layer parameter density configured by CSI-RS-ResourceMapping. Third, the bandwidth of the CSI-RS resource, as given by the higher layer parameter freqBand configured by CSI-RS-ResourceMapping, is the minimum of 52 and $N_{RB}^{BWPi}$ resource blocks, or is equal to $N_{RB}^{BWPj}$ resource blocks. Fourth, the UE 101 is not expected to be configured with the periodicity of $2^\mu \times 10$ slots if the bandwidth of CSI-RS resource is larger than 52 resource blocks. Fourth, the periodicity and slot offset for periodic NZP CSI-RS resources, as given by the higher layer parameter periodicityAndOffset configured by NZP-CSI-RS-Resource, is one of $2^\mu X_p$ slots where $X_p=10$, 20, 40, or 80 and where $\mu$ is defined in Subclause 4.3 of 3GPP TS 38.211. Fifth, the same powerControlOffset and powerControlOffsetSS given by NZP-CSI-RS-Resource value is applied across all resources.

If the UE 101 is configured with the higher layer parameter CSI-RS-Resource-Mobility and the higher layer parameter associatedSSB is not configured, the UE 101 performs measurements based on CSI-RS-Resource Mobility and the UE 101 may base the timing of the CSI-RS resource on the timing of the serving cell.

If the UE 101 is configured with the higher layer parameters CSI-RS-Resource-Mobility and associatedSSB, the UE 101 may base the timing of the CSI-RS resource on the timing of the cell given by the cellId of the CSI-RS resource configuration. Additionally, for a given CSI-RS resource, if the associated SS/PBCH block is configured but not detected by the UE 101, the UE 101 is not required to monitor the corresponding CSI-RS resource. The higher layer parameter isQuasiColocated indicates whether the associated SS/PBCH block given by the associatedSSB and the CSI-RS resource(s) are QCL'd with respect to ['QCL-TypeD'].

If the UE 101 is configured with the higher layer parameter CSI-RS-Resource-Mobility and with periodicity greater than 10 ms in paired spectrum, the UE 101 may assume the absolute value of the time difference between radio frame i between any two cells, listed in the configuration with the higher layer parameter CSI-RS-CellMobility and with same refFreqCSI-RS, is less than 153600 $T_s$.

If the UE 101 is configured with DRX, the UE is not required to perform measurement of CSI-RS resources other than during the active time for measurements based on CSI-RS-Resource-Mobility. If the UE 101 is configured with DRX and DRX cycle in use is larger than 80 ms, the UE 101 may not expect CSI-RS resources are available other than during the active time for measurements based on CSI-RS-Resource Mobility. Otherwise, the UE 101 may assume CSI-RS are available for measurements based on CSI-RS-Resource-Mobility.

When the UE 101 is configured with the higher layer parameters CSI-RS-Resource-Mobility, the UE 101 may expect to be configured with no more than 96 CSI-RS resources when all CSI-RS resources per frequency layer have been configured with associatedSSB, or with no more than 64 CSI-RS resources per frequency layer when all CSI-RS resources have been configured without associatedSSB or when only some of the CSI-RS resources have been configured with associatedSSB. For frequency range 1 the associatedSSB is optionally present for each CSI-RS resource. For frequency range 2 the associatedSSB is either present for all configured CSI-RS resources or not present for any configured CSI-RS resources per frequency layer. For any CSI-RS resource configuration, the UE is to assume that the value for parameter cdm-Type is 'No CDM', and there is only one antenna port.

With respect to UE measurement capabilities, if the UE 101 requires measurement gaps to identify and measure inter-frequency and/or inter-RAT cells and the UE 101 does not support perServingCellMeasurementGap-r14 or is not configured with per serving cell measurement gaps, in order for the requirements in the following subsections to apply the E-UTRAN must provide a single measurement gap pattern with constant gap duration for concurrent monitoring of all frequency layers and RATs. If the UE 101 requires measurement gaps to identify and measure inter-frequency and/or inter-RAT cells and the UE 101 supports perServingCellMeasurementGap-r14 and is configured with per serving cell measurement gaps, in order for the requirements in the following subsections to apply the E-UTRAN must provide gap pattern(s) on at least each serving component carrier (perCC) where the UE 101 has indicated in the perCC-ListGapIndication IE that gaps are required. No gap pattern is required to be provided on the serving component carrier where UE 101 has indicated in the perCC-ListGapIndication IE that gaps are not required. The requirements apply if the gap on each serving cell is at least that which the UE 101 has indicated with gapIndication in the perCC-ListGapIndication IE, and if the gapOffset, MGRP and MGL are the same for each serving component carrier. During the measurement gaps the UE 101.

During the measurement gaps the UE 101 does not transmit any data, is not expected to tune its receiver on any of the E-UTRAN (or NR) carrier frequencies of PCell and any Scell, and is not expected to tune its receiver on any of the E-UTRAN (or NR) carrier frequencies of PCell, PSCell, and SCell.

The UE 101 is able to identify new intra-frequency cells and perform RSRP, RSRQ, and RS-SINR measurements of identified intra-frequency cells without an explicit intra-frequency neighbor cell list containing physical layer cell identities. During the RRC_CONNECTED state the UE shall continuously measure identified intra frequency cells and additionally search for and identify new intra frequency cells.

When no DRX is in use the UE 101 is able to identify a new detectable FDD intra frequency cell within $$T_{identify\ intra} = T_{basic\_identity\_E-UTRA\_FDD,intra} \cdot \frac{T_{Measurement\_Period, Intra}}{T_{Intra}}\ ms,$$

where $T_{basic\_identify\_E-UTRA\_FDD,\ intra}$ is 800 ms.

A cell is considered detectable when RSRP related side conditions given in Sections 9.1.2.1 and 9.1.2.2 are fulfilled for a corresponding Band; RSRQ related side conditions given in Clause 9.1.5.1 are fulfilled for a corresponding Band; RS-SINR related side conditions given in Section 9.1.17.2.1 are fulfilled for a corresponding Band; and SCH_RP and SCH Ês/Iot according to Annex B.2.1 for a corresponding Band.

$T_{intra}$ is the minimum time that is available for intra frequency measurements, during the measurement period with an arbitrarily chosen timing. Time is assumed to be available for performing intra frequency measurements whenever the receiver is guaranteed to be active on the intra frequency carrier.

Identification of a cell includes detection of the cell and additionally performing a single measurement with measurement period of $T_{Measurement\_Period\ Intra}$. If higher layer filtering is used, an additional cell identification delay can be expected.

In the RRC_CONNECTED state the measurement period for intra frequency measurements is 200 ms. When no measurement gaps are activated, the UE 101 is capable of performing RSRP, RSRQ, and RS-SINR measurements for 8 identified-intra-frequency cells, and the UE 101 physical layer is capable of reporting measurements to higher layers with the measurement period of 200 ms. When measurement gaps are activated, including nonUniform1-nonUniform4 gaps, the UE 101 is capable of performing measurements for at least $Y_{measurement\ intra}$ cells, where $Y_{measurement\ intra}$ is defined as:

$$Y_{measurement\ intra} = Floor\left\{X_{basic\ measurement\ FDD} \cdot \frac{T_{Intra}}{T_{Measurement\_Period,\ Intra}}\right\}$$

where $X_{basic\ measurement\ FDD}=8$ (cells), $T_{Measurement\_Period,\ Intra}=200$ milliseconds is the measurement period for intra frequency RSRP, RSRQ, and RS-SINR measurements. If the UE has identified more than $Y_{measurement\ intra}$ cells, the UE 101 performs measurements of at least 8 identified intra-frequency cells but the reporting rate of RSRP, RSRQ, and RS-SINR measurements of cells from UE physical layer to higher layers may be decreased.

The RSRP measurement accuracy for all measured cells is as specified in the sub-clauses 9.1.2.1 and 9.1.2.2 of 3GPP TS 36.133, the RSRQ measurement accuracy for all measured cells is as specified in the sub-clause 9.1.5.1 of 3GPP TS 36.133, and RS-SINR measurement accuracy for all measured cells is as specified in the sub-clause 9.1.17.2.1 of 3GPP TS 36.133.

The UE 101 is capable of performing RSRP, RSRQ, and RS-SINR measurements of at least 4 inter-frequency cells per FDD inter-frequency for up to 3 FDD inter-frequencies or 8 FDD interfrequencies if the UE 101 supports Increased UE carrier monitoring E-UTRA and the UE 101 PHY layer is capable of reporting RSRP, RSRQ, and RS-SINR measurements to higher layers with the measurement period defined in Table 8.1.2.3.1.1-1 of 3GPP TS 36.133.

The UE 101 is capable of performing RSRP, RSRQ, and RS-SINR measurements of at least 4 inter-frequency cells per FDD inter-frequency for up to 3 FDD inter-frequencies or 8 FDD interfrequencies if the UE 101 supports Increased UE carrier monitoring E-UTRA and the UE physical layer is capable of reporting RSRP, RSRQ, and RS-SINR measurements to higher layers with the measurement period defined in Table 8.1.2.3.1.1-1 of 3GPP TS 36.133.

When DRX or eDRX_CONN is in use, the UE 101 is capable of performing RSRP, RSRQ, and RS-SINR measurements of at least 4 inter-frequency cells per FDD inter-frequency and the UE 101 PHY layer is capable of reporting RSRP, RSRQ, and RS-SINR measurements to higher layers with the measurement period $T_{measure\_inter}$, either measurement gaps are scheduled or the UE 101 supports capability of conducting such measurements without gaps. When DRX is used, $T_{measure\_inter}$ is as defined in Table 8.1.2.3.1.2-2 of 3GPP TS 36.133, and when eDRX_CONN is in use, $T_{measure\_inter}$ is as defined in Table 8.1.2.3.1.2-3 for GP0 and GP1. If the UE 101 is configured with nonUniform1-nonUniform4 $T_{identify\_inter}$ is as defined in Table 8.1.2.3.1.2-4 of 3GPP TS 36.133.

The UE 101 is capable of performing RSRP, RSRQ, RS-SINR measurements of at least 4 inter-frequency cells per TDD inter-frequency and the UE 101 physical layer is capable of reporting RSRP, RSRQ, and RS-SINR measurements to higher layers with the measurement period $T_{Measurement\_Period\_TDD\_Inter}$.

When DRX or eDRX_CONN is in use, the UE 101 is capable of performing RSRP, RSRQ, and RS-SINR measurements of at least 4 inter-frequency cells per TDD inter-frequency for up to 3 TDD inter-frequencies and the UE physical layer is capable of reporting RSRP, RSRQ, and RS-SINR measurements to higher layers with the measurement period $T_{measure\_inter}$, either measurement gaps are scheduled or the UE supports capability of conducting such measurements without gaps. When DRX is in use, $T_{measure\_inter}$ is as defined in Table 8.1.2.3.2.2-2 of 3GPP TS 36.133, and when eDRX_CONN is in use, $T_{measure\_inter}$ is as defined in Table 8.1.2.3.2.2-3 of 3GPP TS 36.133 for GP0 and GP1. If the UE 101 is configured with nonUniform1-nonUniform4 $T_{identify\_inter}$ is as defined in Table 8.1.2.3.2.2-4 of 3GPP TS 36.133.

The UE 101 is capable of performing RSRP, RSRQ, and RS-SINR measurements of at least 4 inter-frequency cells per FDD inter-frequency for up to 3 FDD inter-frequencies or 8 FDD interfrequencies if the UE 101 supports Increased UE carrier monitoring E-UTRA and the UE physical layer is capable of reporting RSRP, RSRQ, and RS-SINR measurements to higher layers with the measurement period defined in Table 8.1.2.3.9.1-1 of 3GPP TS 36.133.

When DRX or eDRX_CONN is in use, the UE 101 is capable of performing RSRP, RSRQ, and RS-SINK measurements of at least 4 inter-frequency cells per FDD inter-frequency and the UE 101 physical layer is capable of reporting RSRP, RSRQ, and RS-SINR measurements to higher layers with the measurement period $T_{measure\_inter}$, either measurement gaps are scheduled or the UE 101 supports capability of conducting such measurements without gaps. When DRX is used, $T_{measure\_inter}$ is as defined in Table 8.1.2.3.9.2-2 of 3GPP TS 36.133, and when eDRX_CONN is in use, $T_{measure\_inter}$ is as defined in Table 8.1.2.3.9.2-3 of 3GPP TS 36.133 for GP0 and GP1. If UE 101 is configured with nonUniform1-nonUniform4 $T_{identify\_inter}$ is as defined in Table 8.1.2.3.9.2-4 of 3GPP TS 36.133.

The measurement period for deactivated Scell measurements is $T_{measure\_scc}$ according to the parameter measCycleSCell where $T_{measure\_scc}$=5 measCycleSCell. The UE 101 is capable of performing RSRP, RSRQ, and RS-SINR measurements for 8 identified cells on a secondary component carrier, and the UE physical layer is capable of reporting measurements to higher layers with the measurement period of $T_{measure\_scc}$.

The measurement period for deactivated Scell measurements is $T_{measure\_scc}$ according to the parameter measCycleSCell where $T_{measure\_scc}$=max(5 measCycleSCell, $T_{measure\_scc1}$). The UE 101 is capable of performing RSRP, RSRQ, and RS-SINR measurements for 8 identified cells on a secondary component carrier, and the UE 101 physical layer is capable of reporting measurements to higher layers with the measurement period of $T_{measure\_scc}$. $T_{measure\_scc1}$ is given in table 8.3.3.2.2-2 of 3GPP TS 36.133.

The UE 101 is capable of performing RSRP, RSRQ, and RS-SINR measurements of at least 4 inter-frequency cells per FDD inter-frequency for up to 6 FDD inter-frequencies and the UE 101 physical layer is capable of reporting RSRP, RSRQ, and RS-SINR measurements to higher layers with the measurement period defined in Table 8.17.3.2.2-1 of 3GPP TS 36.133.

When DRX or eDRX_CONN is in use, the UE 101 is capable of performing RSRP, RSRQ, and RS-SINR measurements of at least 4 inter-frequency cells per FDD inter-frequency and the UE 101 physical layer is capable of reporting RSRP, RSRQ, and RS-SINR measurements to higher layers with the measurement period $T_{measure\_inter}$, either measurement gaps are scheduled or the UE 101 supports capability of conducting such measurements without gaps. When DRX is used, $T_{measure\_inter}$ is as defined in Table 8.17.3.2.2.2-2 of 3GPP TS 36.133, and when eDRX_CONN is in use, $T_{measure\_inter}$ is as defined in Table 8.17.3.2.2.2-3 of 3GPP TS 36.133. When MCG DRX is in use the applicable DRX cycle is the MCG DRX cycle.

The UE 101 is capable of performing RSRP, RSRQ, and RS-SINR measurements of at least 4 inter-frequency cells per TDD inter-frequency for up to 6 TDD inter-frequencies and the UE 101 physical layer is capable of reporting RSRP, RSRQ, and RS-SINR measurements to higher layers with the measurement period defined in Table 8.17.3.3.1.2-1 of 3GPP TS 36.133.

When DRX or eDRX_CONN is in use, the UE 101 is capable of performing RSRP, RSRQ, and RS-SINR measurements of at least 4 inter-frequency cells per TDD inter-frequency and the UE 101 physical layer is capable of reporting RSRP, RSRQ, and RS-SINR measurements to higher layers with the measurement period $T_{measure\_inter}$, either measurement gaps are scheduled or the UE 101 supports capability of conducting such measurements without gaps. When DRX is used, $T_{measure\_inter}$ is as defined in Table 8.17.3.3.2.2-2 of 3GPP TS 36.133, and when eDRX_CONN is in use, $T_{measure\_inter}$ is as defined in Table 8.17.3.3.2.2-3 of 3GPP TS 36.133. When MCG DRX is in use the applicable DRX cycle is the MCG DRX cycle.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5GC 120 are discussed in more detail with regard to FIG. 3.

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 may include an EMM sublayer, and an mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 may include a database for network users, including subscription-related information to support the network entities' handling of communication sessions. The EPC 220 may include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP interface 125 (see, e.g., FIG. 1). In some examples, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a data network (DN) 303, which may be, for example, operator services, Internet access or 3rd party services; and a 5GC 320. The 5GC 320 may include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which may include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which may include or be a N2 reference point between the (R)AN 310 and the AMF 321. In some examples, the AMF 321 may be a termination point of NAS (N1) signaling and perform NAS ciphering and integrity protection.

AMF 321 may also support NAS signaling with a UE 301 over a N3 interworking function (IWF) interface (referred to as the "N3IWF"). The N3IWF may be used to provide access to untrusted entities. The N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some examples, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some examples, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be (R)AN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a (R)AN 310 signaling connection (e.g., N2 and/or N3 connections) for the UE 301. Establishment of a N2 connection between the (R)AN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the (R)AN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some examples, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which may include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 may include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM front end, which is in charge of processing credentials, location management, subscription management and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 may include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown in FIG. 3, such as a data storage system, a 5G-EIR, a security edge protection pro10 (SEPP), and the like. The data storage system may include a structured data storage function (SDSF), an unstructured data storage function (UDSF), or both, among others. Any network function may store and retrieve unstructured data to or from the UDSF (e.g., UE contexts), using a N18 reference point between any NF and the UDSF (not shown in FIG. 3). Individual network functions may share a UDSF for storing their respective unstructured data or individual network functions may each have their own UDSF located at or near the individual network functions. Additionally, the UDSF may exhibit a Nudsf service-based interface (not shown in FIG. 3). The 5G-EIR may be a network function that checks the status of permanent equipment identifiers (PEI) for determining whether particular equipment or entities are blacklisted from the network; and the SEPP may be a non-transparent pro10 that performs topology hiding, message filtering, and policing on inter-PLMN control plane interfaces.

In some examples, there may be additional or alternative reference points or service-based interfaces, or both, between the network function services in the network functions. However, these interfaces and reference points have been omitted from FIG. 3 for clarity. In one example, the CN 320 may include a Nx interface, which is an inter-CN interface between the MME (e.g., MME 221) and the AMF 321 in order to enable interworking between CN 320 and CN 220. Other example interfaces or reference points may include a N5g-EIR service-based interface exhibited by a 5G-EIR, a N27 reference point between the NRF in the visited network and the NRF in the home network, or a N31 reference point between the NSSF in the visited network and the NSSF in the home network, among others.

Figure 4:
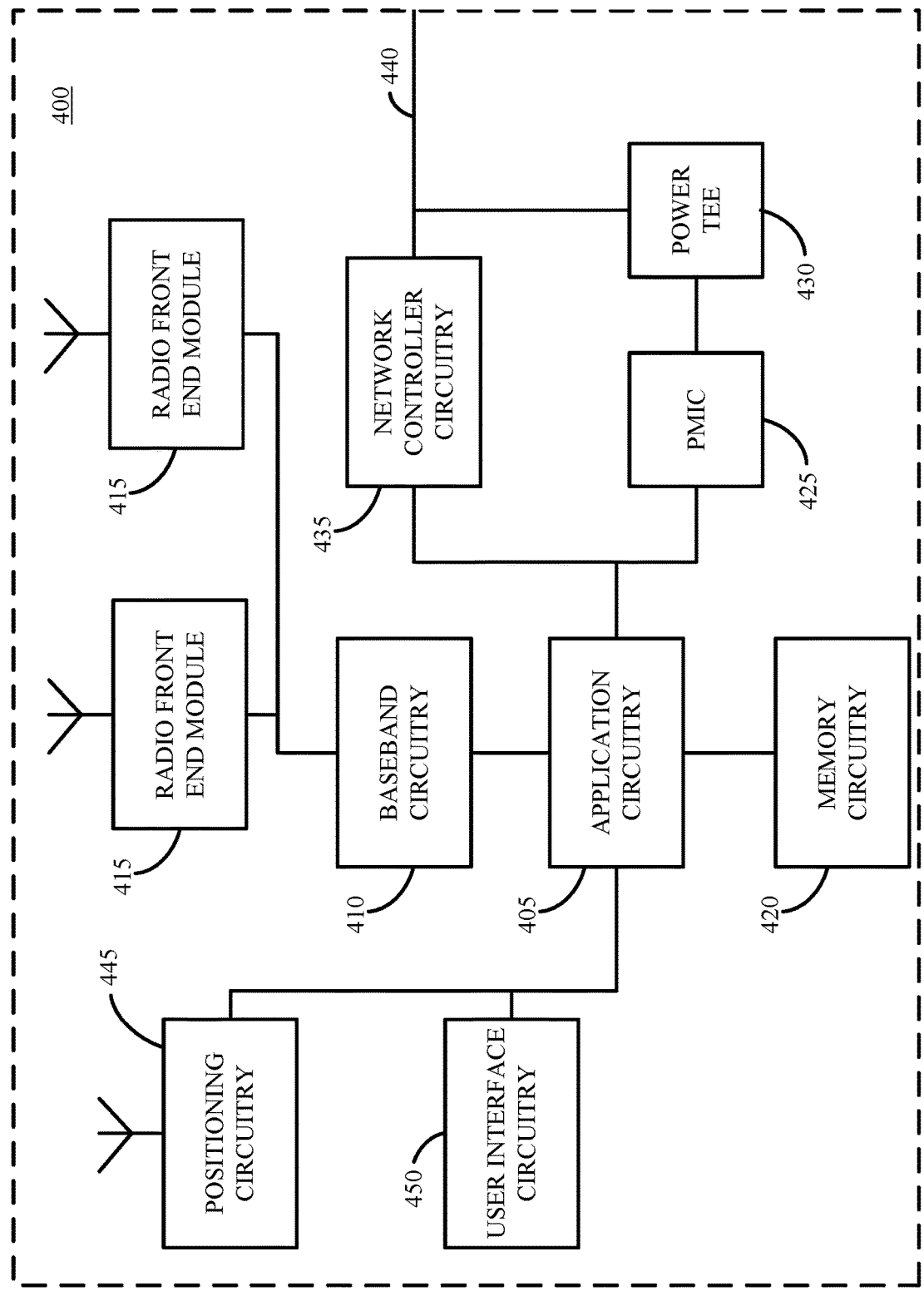
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 or AP 106 shown and described previously, an application server(s) 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some examples, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 405 may include, or may be, a special-purpose processor or controller configured to carry out the various techniques described here. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some examples, the system 400 may not utilize application circuitry 405, and instead may include a special-purpose processor or controller to process IP data received from an EPC or 5GC, for example.

In some examples, the application circuitry 405 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some examples, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed with regard to FIG. 6.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some examples, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 420 may include three-dimensional (3D) cross-point (XPOINT) memories from Intel® and Micron®. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some examples, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 4 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 5:
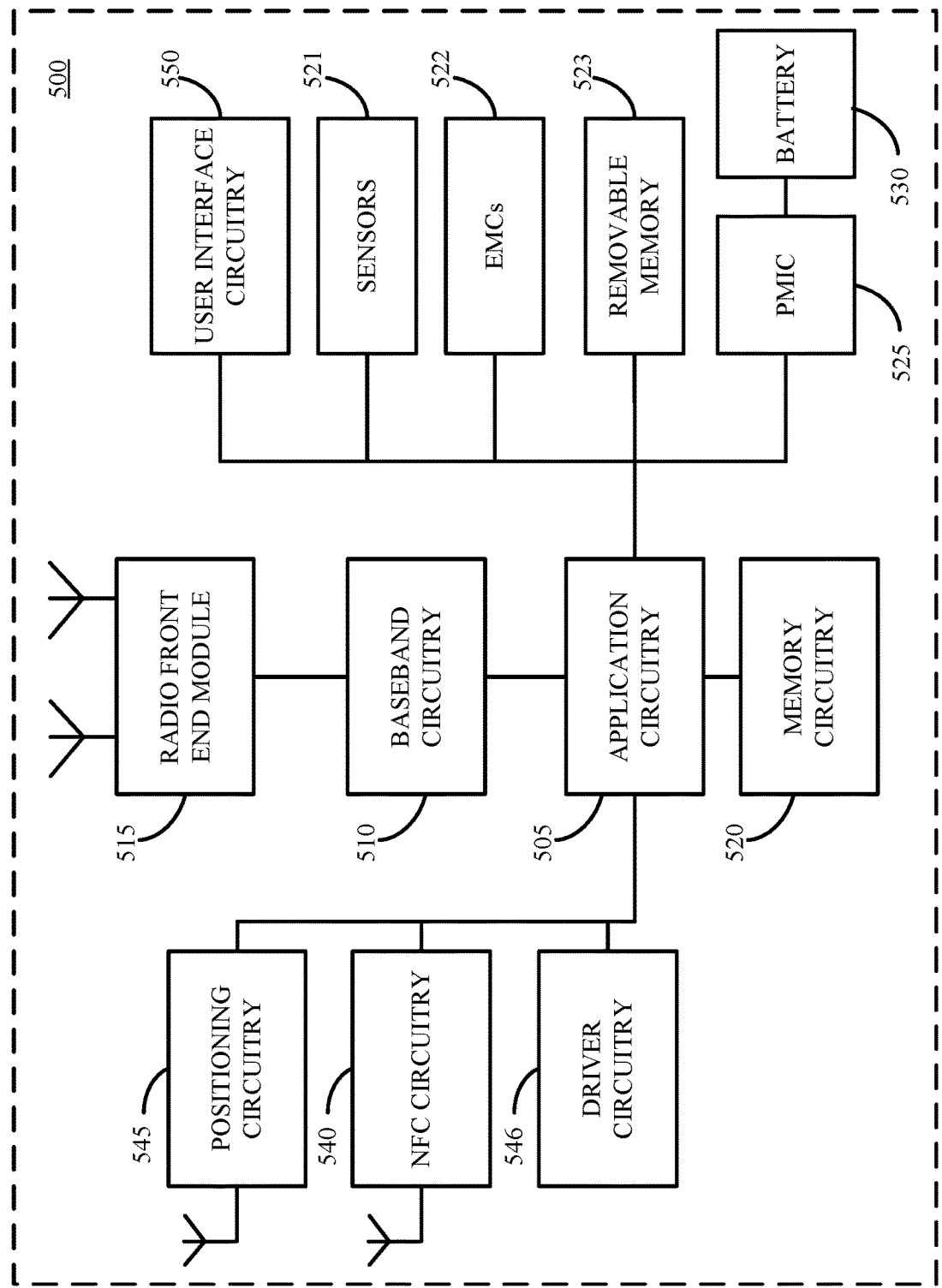
FIG. 5 illustrates an example of a platform or device.

FIG. 5 illustrates an example of a platform 500 (or "device 500"). In some examples, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some examples, the platform 500 may include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 405 may include, or may be, a special-purpose processor/controller to carry out the techniques described herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some examples, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 505 may include logic blocks or logic fabric, and other interconnected resources that may be programmed to perform various functions, such as the procedures, methods, functions described herein. In some examples, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some examples, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 500 may incorporate the three-dimensional (3D) cross-point (XPOINT) memories from Intel® and Micron®.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some examples, the platform 500 is configured to operate one or more EMCs 522 based on one or more captured events, instructions, or control signals received from a service provider or clients, or both.

In some examples, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 545 may include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some examples, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some examples, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC Idle state, where it disconnects from the network and does not perform operations such as channel quality feedback or handover. This can allow the platform 500 to enter a very low power state, where it periodically wakes up to listen to the network and then powers down again. In some examples, the platform 500 may not receive data in the RRC Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some examples the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some examples, such as in V2X applications, the battery 530 may be a typical lead-acid automotive battery.

In some examples, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

A power block, or other power supply coupled to an electrical grid may be coupled with the BMS to charge the battery 530. In some examples, the power block 530 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some examples, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 6:
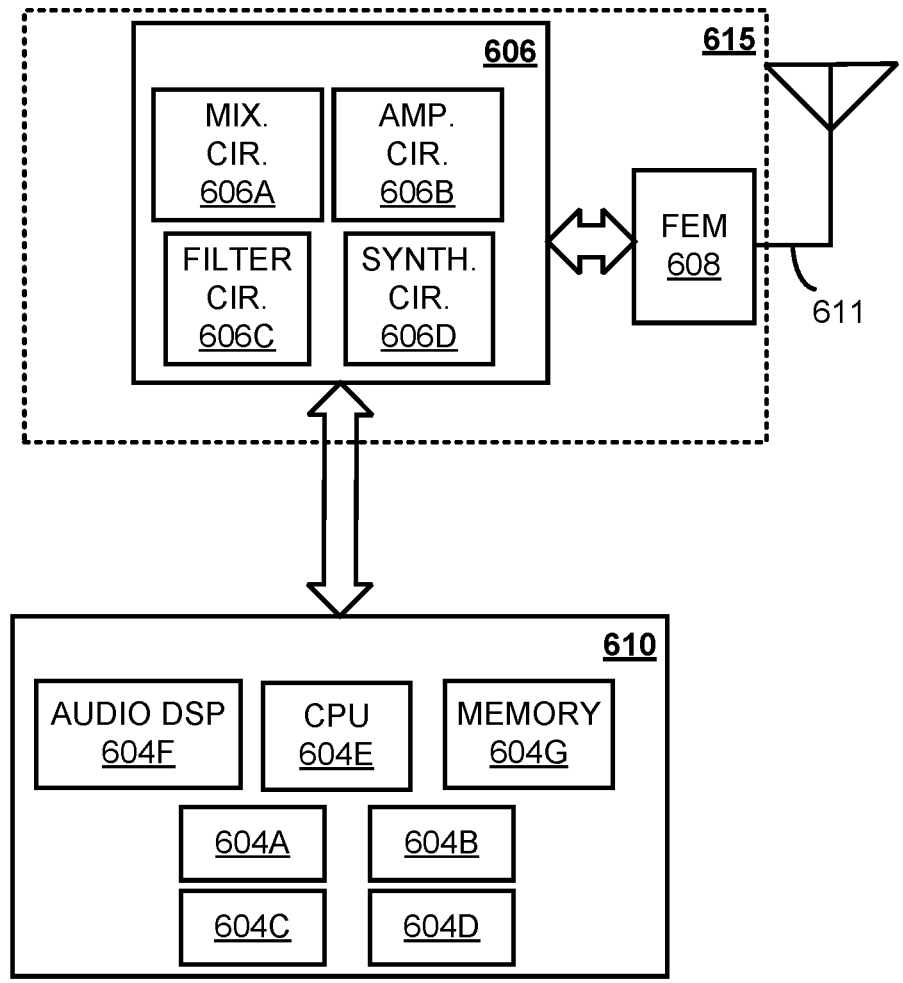
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together.

The baseband circuitry 610 includes circuitry or control logic, or both, configured to carry out various radio or network protocol and control functions that enable communication with one or more radio networks using the RF circuitry 606. The radio control functions may include, but are not limited to, signal modulation and demodulation, encoding and decoding, and radio frequency shifting. In some examples, modulation and demodulation circuitry of the baseband circuitry 610 may include Fast-Fourier Transform (FFT), precoding, or constellation mapping and demapping functionality. In some examples, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some examples, some or all of the functionality of baseband processors 604A-D may be included in modules stored in the memory 604G and executed using a Central Processing Unit (CPU) 604E. In some examples, some or all of the functionality of baseband processors 604A-D may be provided as hardware accelerators (e.g., FPGAs or ASICs) loaded with the appropriate bit streams or logic blocks stored in respective memory cells. In some examples, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression and decompression and echo cancellation and may include other suitable processing elements in some examples.

In some examples, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 6); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 525.

In some examples (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 610 may include protocol processing circuitry with one or more instances of control circuitry (not shown) to provide control functions for the digital baseband circuitry or radio frequency circuitry (e.g., the radio front end modules 615).

Although not shown in FIG. 6, in some examples, the baseband circuitry 610 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 610 may be suitably combined in a single chip or chipset, or disposed on a same circuit board. In some examples, some or all of the constituent components of the baseband circuitry 610 and RF circuitry 606 may be implemented together such as, for example, a system on a chip (SoC) or System-in-Package (SiP). In some examples, some or all of the constituent components of the baseband circuitry 610 may be implemented as a separate SoC that is communicatively coupled with and RF circuitry 606 (or multiple instances of RF circuitry 606). In some examples, some or all of the constituent components of the baseband circuitry 610 and the application circuitry 405, 505 may be implemented together as individual SoCs mounted to a same circuit board (e.g., a "multi-chip package").

In some examples, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some examples, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some examples, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some examples, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some examples, the output baseband signals may be zero-frequency baseband signals, although this is not a requirement. In some examples, the mixer circuitry 606a of the receive signal path may comprise passive mixers.

In some examples, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some examples, the mixer circuitry 606a of the receive signal path and the mixer circuitry 606a of the transmit signal path may include two or more mixers and may be arranged for quadrature downconversion and upconversion, respectively. In some examples, the mixer circuitry 606a of the receive signal path and the mixer circuitry 606a of the transmit signal path may include two or more mixers and may be arranged for image rejection (e.g., Hartley image rejection). In some examples, the mixer circuitry 606a of the receive signal path and the mixer circuitry 606a of the transmit signal path may be arranged for direct downconversion and direct upconversion, respectively. In some examples, the mixer circuitry 606a of the receive signal path and the mixer circuitry 606a of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode examples, a separate radio IC circuitry may be provided for processing signals for each spectrum, although the techniques described here are not limited in this respect.

In some examples, the synthesizer circuitry 606d may be a fractional-N synthesizer or a fractional N/N+1 synthesizer, although other types of frequency synthesizers may used. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some examples, the synthesizer circuitry 606d may be a fractional N/N+1 synthesizer.

In some examples, frequency input may be provided by a voltage controlled oscillator (VCO), although that is not a requirement. Divider control input may be provided by either the baseband circuitry 610 or the application circuitry 405/505 depending on the desired output frequency. In some examples, a divider control input (e.g., N) may be determined from a look-up table based on a channel indicated by the application circuitry 405, 505.

The synthesizer circuitry 606*d* of the RF circuitry 606 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out) to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 606*d* may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some examples, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
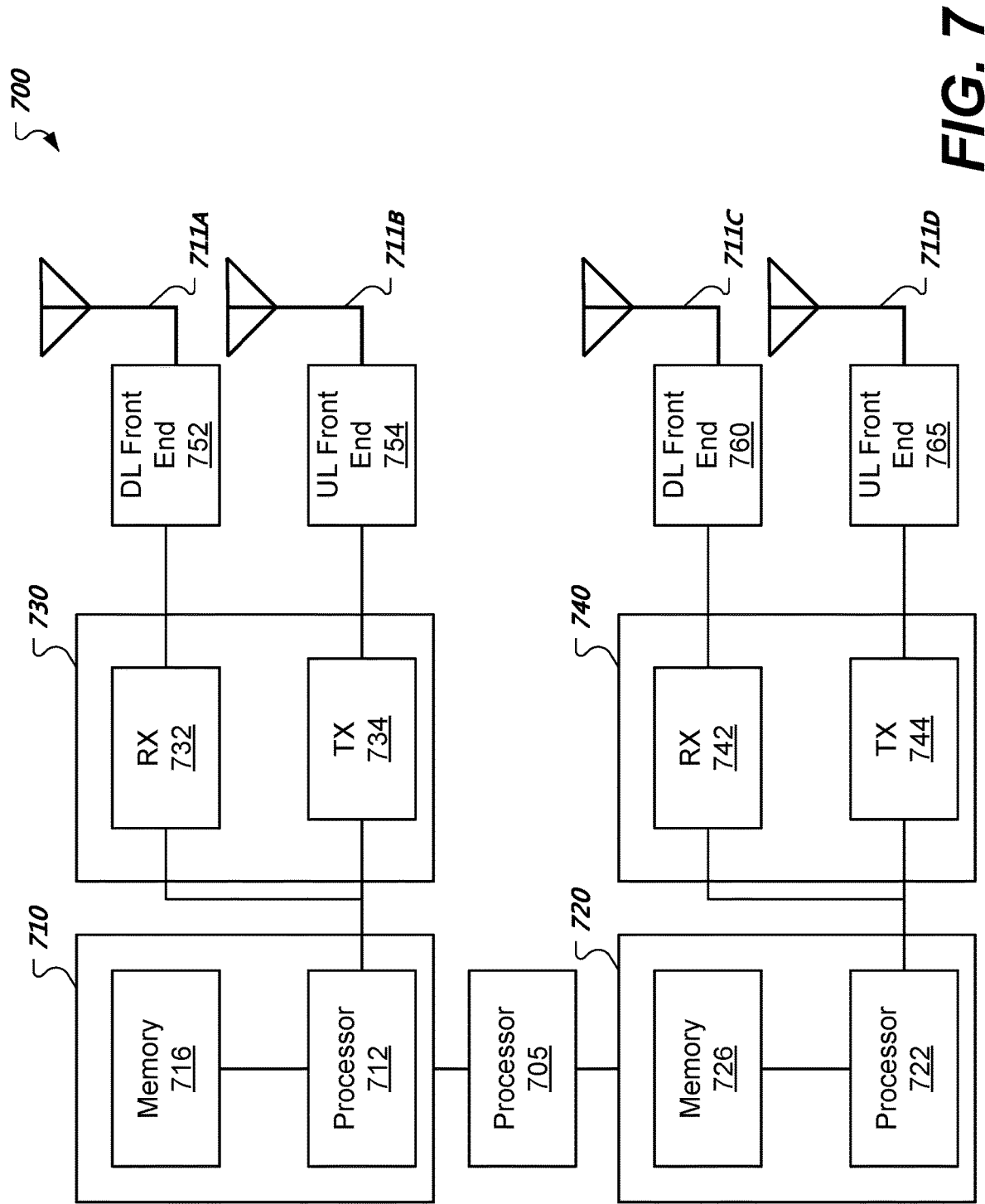
FIG. 7 illustrates example components of cellular communication circuitry.

FIG. 7 illustrates example components of communication circuitry 700. In some examples, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 702*a-c*. In some examples, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 may include circuitry for transmitting and receiving radio signals. For example, the RF front end 730 includes receive circuitry (RX) 732 and transmit circuitry (TX) 734. In some examples, the receive circuitry 732 is in communication with a DL front end 750, which may include circuitry for receiving radio signals from the antenna 702*a*. A switch 770 may selectively couple the modem 710 to an UL front end 772, which may include circuitry for transmitting radio signals using the antenna 702*c*.

Similarly, the modem 720 includes one or more processors 722 and a memory 726 in communication with the processors 722. The modem 720 is in communication with an RF front end 740, which may correspond to or be a part of to the RFEM 415 and 515 of FIGS. 4 and 5. The RF front end 740 may include circuitry for transmitting and receiving radio signals. For example, the RF front end 740 includes receive circuitry 742 and transmit circuitry 744. In some examples, the receive circuitry 742 is in communication with a DL front end 760, which may include circuitry for receiving radio signals from the antenna 702*b*. The switch 770 may selectively couple the modem 720 to the UL front end 772 for transmitting radio signals using the antenna 702*c*.

The modem 710 may include hardware and software components for time division multiplexing UL data (e.g., for NSA NR operations), as well as the various other techniques described herein. The processors 712 may include one or more processing elements configured to implement various features described herein, such as by executing program instructions stored on the memory 716 (e.g., a non-transitory computer-readable memory medium). In some examples, the processor 712 may be configured as a programmable hardware element, such as a FPGA or an ASIC. In some examples, the processors 712 may include one or more ICs that are configured to perform the functions of processors 712. For example, each IC may include circuitry configured to perform the functions of processors 712.

The modem 720 may include hardware and software components for time division multiplexing UL data (e.g., for NSA NR operations), as well as the various other techniques described herein. The processors 722 may include one or more processing elements configured to implement various features described herein, such as by executing instructions stored on the memory 726 (e.g., a non-transitory computer-readable memory medium). In some examples, the processor 722 may be configured as a programmable hardware element, such as a FPGA or an ASIC. In some examples, the processor 722 may include one or more ICs that are configured to perform the functions of processors 722. For example, each IC may include circuitry configured to perform the functions of processors 522.

Figure 8:
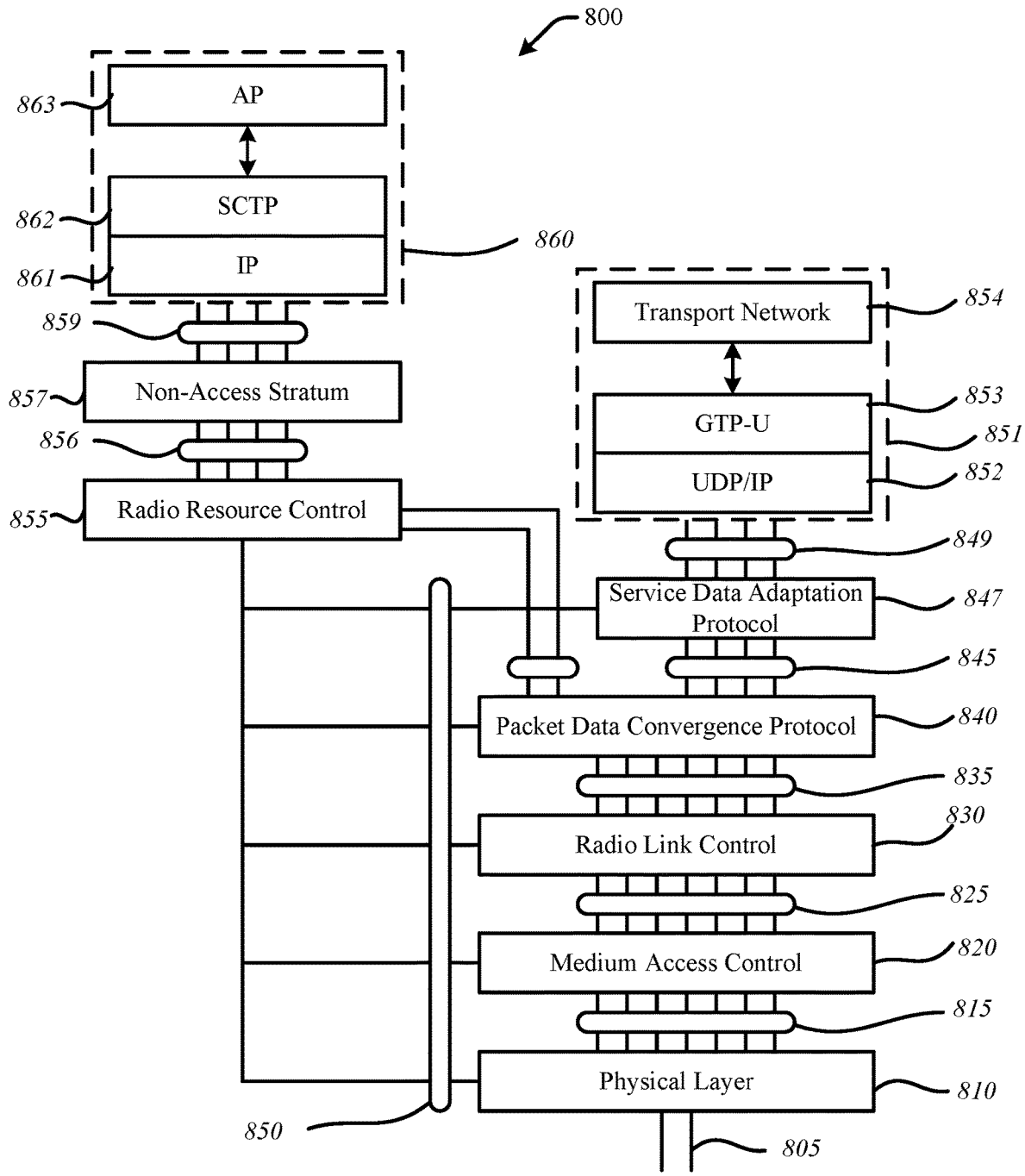
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 810 may process requests from and provide indications to an instance of MAC 820 using one or more PHY-SAP 815. In some examples, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some examples, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some examples, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some examples, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some examples, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some examples, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some examples, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some examples, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
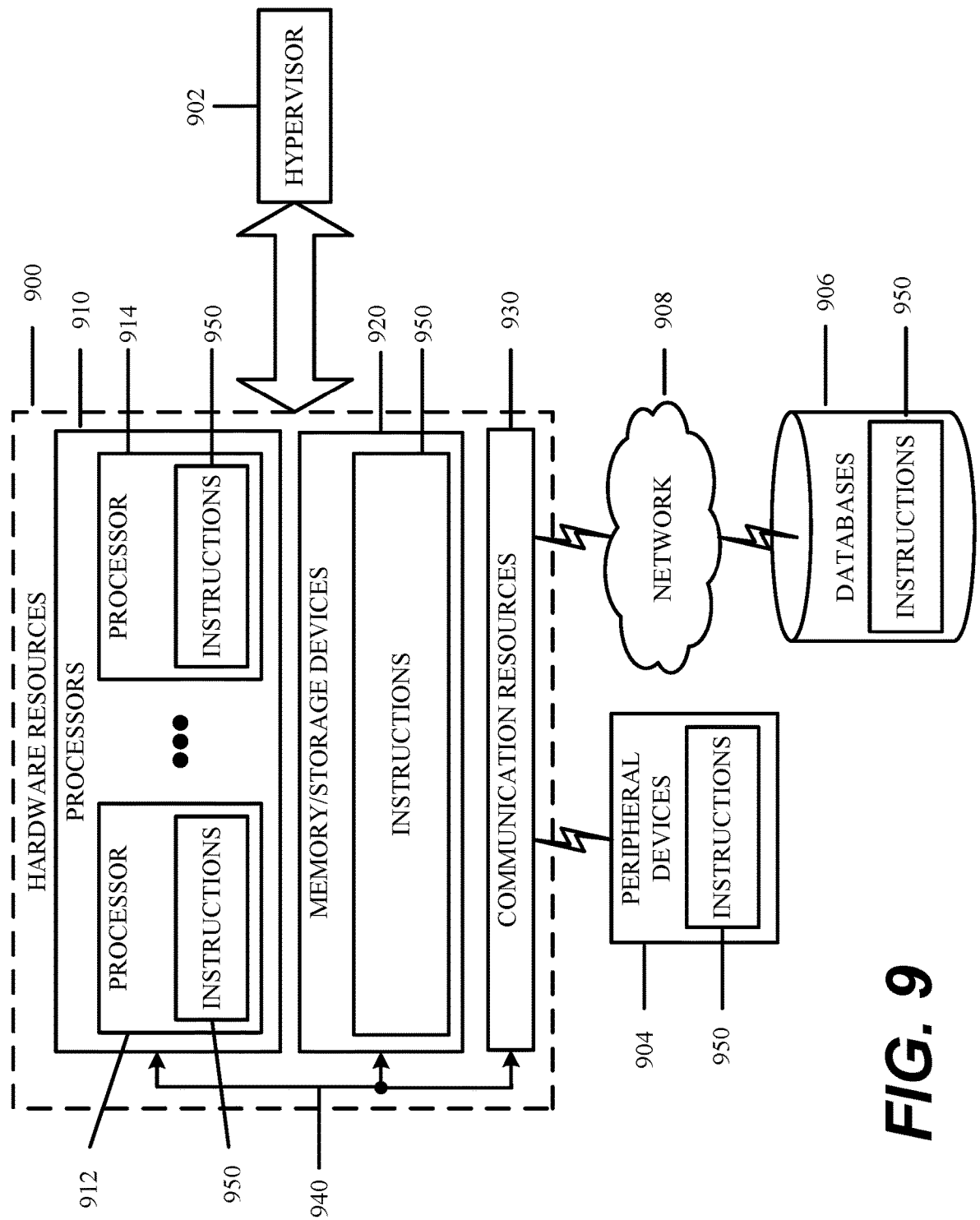
FIG. 9 illustrates an example of a computer system.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Returning to FIG. 8, The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and PRACH-ConfigSIB, PDSCH-ConfigCommon, PUSCH-ConfigCommon, PUCCH-ConfigCommon, SoundingRS-UL-ConfigCommon, UplinkPowerControlCommon, UL-CyclicPrefixLength, and one or more of following optional parameters: plinkPowerControlCommon-v1020, RACH-ConfigCommon-v1250, PUSCH-ConfigCommon-v1270, BCCH-Config-v1310, PCCH-Config-v1310, FreqHoppingParameters-r13, PDSCH-ConfigCommon-v1310, PUSCH-ConfigCommon-v1310, PRACH-ConfigSIB-v1310, PUCCH-ConfigCommon-v1310, HighSpeedConfig-r14, PRACH-Config-v1430, PUCCH-ConfigCommon-v1430, PRACH-ConfigSIB-v1530, RSS-Config-r15, WUS-Config-r15, or HighSpeedConfig-v1530. This is shown in Structure #1:

```
Structure #1

RadioResourceConfigCommonSIB ::=   SEQUENCE {
    rach-ConfigCommon            RACH-ConfigCommon,
    bcch-Config                  BCCH-Config,
    pcch-Config                  PCCH-Config,
    prach-Config                 PRACH-ConfigSIB,
    pdsch-ConfigCommon           PDSCH-ConfigCommon,
    pusch-ConfigCommon           PUSCH-ConfigCommon,
    pucch-ConfigCommon           PUCCH-ConfigCommon,
    soundingsRS-UL-ConfigCommon  SoundingRS-UL-ConfigCommon,
    uplinkPowerControlCommon     UplinkPowerControlCommon,
    ul-CyclicPrefixLength        UL-CyclicPrefixLength,
    ...,
    [[ uplinkPowerControlCommon-v1020     UplinkPowerControlCommon-
v1020    OPTIONAL   -- Need OR ]],
    [[ rach-ConfigCommon-v1270            RACH-ConfigCommon-
v1250            OPTIONAL   -- Need OR ]],
    [[ pusch-ConfigCommon-v1270           PUSCH-ConfigCommon-v1270
    OPTIONAL   -- Need OR ]],
    [[ bcch-Config-v1310    BCCH-Config-v1310    OPTIONAL,    -- Need OR
       pcch-Config-v1310    PCCH-Config-v1310    OPTIONAL,    -- Need OR
       freqHoppingParameters-r13   FreqHoppingParameters-r13   OPTIONAL, --
Need OR
       pdsch-ConfigCommon-v1310    PDSCH-ConfigCommon-1310 OPTIONAL, --
Need OR
       pusch-ConfigCommon-v1310    PUSCH-ConfigCommon-1310 OPTIONAL, --
Need OR
       prach-ConfigCommon-v1310    PRACH-ConfigSIB-v1310    OPTIONAL, --
Need OR
       pucch-ConfigCommon-v1310    PUCCH-ConfigCommon-v1310 OPTIONAL, --
Need OR]],
    [[ highSpeedConfig-r14 HighSpeedConfig-r14    OPTIONAL,   -- Need OR
       prach-Config-v1430  PRACH-Config-v1430    OPTIONAL,   -- Need OR
       pucch-ConfigCommon-v1430   PUCCH-ConfigCommon-v1430 OPTIONAL--
Need OR]],
    [[ prach-Config-v1530 PRACH-ConfigSIB-v1530 OPTIONAL,   -- Cond EDT
       ce-RSS-Config-r15  RSS-Config-r15           OPTIONAL,   --Need OR
       wus-Config-r15     WUS-Config-r15           OPTIONAL,   --Need OR
       highSpeedConfig-v1530  HighSpeedConfig-v1530 OPTIONAL   --Need OR]]
}
```

SIBs may comprise one or more information elements (IEs), which may each comprise individual data fields or data structures. Some example IEs that may be included in suitable RRC message according to the embodiments herein may be as follows.

A RadioResourceConfigCommonSIB IE is used to specify common radio resource configurations (along with a RadioResourceConfigCommon IE) in the system information and in the mobility control information, respectively, such as the random access parameters and the static physical layer parameters.

The RadioResourceConfigCommonSIB IE can be defined as follows. The RadioResourceConfigCommonSIB IE specifies the following radio resource configuration including RACH-ConfigCommon, BCCH-Config, PCCH-Config, The RadioResourceConfigCommon IE can be defined as follows. The RadioResourceConfigCommonSIB IE specifies the following radio resource configuration including RACH-ConfigCommon, PRACH-Config, PDSCH-Config-Common, PUSCH-ConfigCommon, PHICH-Config, PUCCH-ConfigCommon, SoundingRS-UL-ConfigCommon, UplinkPowerControlCommon, ntennaInfoCommon, P-Max, TDD-Config, UL-CyclicPrefixLength, UplinkPowerControlCommon-v1020, TDD-Config-v1130, PUSCH-ConfigCommon-1270, PRACH-Config-v1310, FreqHoppingParameters-r13, PDSCH-ConfigCommon-v1310, PUCCH-ConfigCommon-v1310, PUSCH-ConfigCommon-v1310, UplinkPowerControlCommon-v1310, HighSpeedConfig-r14, PRACH-Config-v1430, PUCCH-ConfigCommon-v1430, TDD-Config-v1430, TDD-Config-v1450, UplinkPowerControlCommon-v1530, and HighSpeedConfig-v1530. This is shown in Structure #2:

Structure #2

```
RadioResourceConfigCommon ::=        SEQUENCE {
    rach-ConfigCommon        RACH-ConfigCommon    OPTIONAL,   -- Need ON
    prach-Config             PRACH-Config,
    pdsch-ConfigCommon       PDSCH-ConfigCommon   OPTIONAL,   -- Need ON
    pusch-ConfigCommon       PUSCH-ConfigCommon,
    phich-Config             PHICH-Config         OPTIONAL,   -- Need ON
    pucch-ConfigCommon       PUCCH-ConfigCommon   OPTIONAL,   -- Need ON
    soundingRS-UL-ConfigCommon   SoundingRS-UL-ConfigCommon
OPTIONAL,   -- Need ON
    uplinkPowerControlCommon     UplinkPowerControlCommon
OPTIONAL,  -- Need ON
    antennaInfoCommon        AntennaInfoCommon    OPTIONAL,   -- Need ON
    p-Max                    P-Max                OPTIONAL,   -- Need OP
    tdd-Config               TDD-Config           OPTIONAL,   -- Cond TDD
    ul-CyclicPrefixLength    UL-CyclicPrefixLength,
...,
    [[ uplinkPowerControlCommon-v1020       UplinkPowerControlCommon-
v1020      OPTIONAL        -- Need ON]],
    [[ tdd-Config-v1130            TDD-Config-v1130 OPTIONAL          -- Cond TDD3]],
    [[ pusch-ConfigCommon-v1270        PUSCH-ConfigCommon-v1270 OPTIONAL  --
Need OR]],
    [[ prach-Config-v1310      PRACH-Config-v1310    OPTIONAL,   -- Need ON
        freqHoppingParameters-r13       FreqHoppingParameters-r13
OPTIONAL,   -- Need ON
        pdsch-ConfigCommon-v1310           PDSCH-ConfigCommon-v1310
OPTIONAL,   -- Need ON
        pucch-ConfigCommon-v1310           PUCCH-ConfigCommon-v1310
OPTIONAL,   -- Need ON
        pusch-ConfigCommon-v1310           PUSCH-ConfigCommon-v1310
OPTIONAL,   -- Need ON
        uplinkPowerControlCommon-v1310         UplinkPowerControlCommon-v1310
OPTIONAL    -- Need ON]],
    [[ highSpeedConfig-r14         HighSpeedConfig-r14
OPTIONAL,   -- Need OR
        prach-Config-v1430             PRACH-Config-v1430
OPTIONAL,   -- Need OR
        pucch-ConfigCommon-v1430           PUCCH-ConfigCommon-v1430
OPTIONAL,   -- Need OR
        tdd-Config-v1430               TDD-Config-v1430
OPTIONAL    -- Cond TDD3]],
    [[ tdd-Config-v1450            TDD-Config-v1450
OPTIONAL    -- Cond TDD3]],
    [[ uplinkPowerControlCommon-v1530          UplinkPowerControlCommon-v1530
OPTIONAL,   -- Need ON
        highSpeedConfig-v1530          HighSpeedConfig-v1530
OPTIONAL    -- Need OR]]
}
```

Parameters of the RadioResourceConfigCommon IE and the RadioResourceConfigCommonSIB IE can be defined as shown below in Structure #3. More specifically, the parameters of the PSCell and the SCell.

Structure #3

```
RadioResourceConfigCommonPSCell-r12 ::=  SEQUENCE {
    basicFields-r12                 RadioResourceConfigCommonSCell-r10,
    pucch-ConfigCommon-r12          PUCCH-ConfigCommon,
    rach-ConfigCommon-r12           RACH-ConfigCommon,
    uplinkPowerControlCommonPSCell-r12   UplinkPowerControlCommonPSCell-
r12,
    ...,
    [[ uplinkPowerControlCommonPSCell-v1310
    UplinkPowerControlCommon-v1310          OPTIONAL   -- Need ON]],
    [[ uplinkPowerControlCommonPSCell-v1530
    UplinkPowerControlCommon-v1530          OPTIONAL   -- Need ON]]}
RadioResourceConfigCommonPSCell-v12f0 ::=    SEQUENCE {
    basicFields-v12f0                   RadioResourceConfigCommonSCell-v1010}
RadioResourceConfigCommonPSCell-v1440 ::=    SEQUENCE {
    basicFields-v1440     RadioResourceConfigCommonSCell-v1440}
RadioResourceConfigCommonSCell-r10 ::=    SEQUENCE {
    -- DL configuration as well as configuration applicable for DL and UL
```

| Structure #3 |
|---|

```
    nonUL-Configuration-r10            SEQUENCE {
        -- 1: Cell characteristics
        dl-Bandwidth-r10   ENUMERATED {n6, n15, n25, n50, n75, n100},
        -- 2: Physical configuration, general
        antennaInfoCommon-r10      AntennaInfoCommon, mbsfn-SubframeConfigList-
r10 MBSFN-SubframeConfigList    OPTIONAL,   -- Need OR
        -- 3: Physical configuration, control
        phich-Config-r10           PHICH-Config,
        -- 4: Physical configuration, physical channels
        pdsch-ConfigCommon-r10     PDSCH-ConfigCommon
        tdd-Config-r10             TDD-Config   OPTIONAL   -- Cond TDDSCell
    },
    -- UL configuration
    ul-Configuration-r10              SEQUENCE {
        ul-FreqInfo-r10                SEQUENCE {
            ul-CarrierFreq-r10                  ARFCN-ValueEUTRA OPTIONAL, --
Need OP
            ul-Bandwidth-r10             ENUMERATED {n6, n15,   n25, n50,
                                         n78, n100}  OPTIONAL,   -- Need OP
            additionalSpectrumEmissionSCell-r10         AdditionalSpectrumEmission
        },
        p-Max-r10     P-Max   OPTIONAL,       -- Need OP
        uplinkPowerControlCommonSCell-r10       UplinkPowerControlComm on SCell-
r10,
        -- A special version of IE UplinkPowerControlCommon may be introduced
        -- 3: Physical configuration, control
        soundingRS-UL-ConfigCommon-r10       SoundingRS-UL-ConfigCommon,
        ul-CyclicPrefixLength-r10          UL-CyclicPrefixLength,
        -- 4: Physical configuration, physical channels
        prach-ConfigSCell-r10              PRACH-ConfigSCell-r10
OPTIONAL,   -- Cond TDD-OR-NoR11
        pusch-ConfigCommon-r10             PUSCH-ConfigCommon                OPTIONAL,
    }
    -- Need OR
    ...,
    [[ ul-CarrierFreq-v1090         ARFCN-ValueEUTRA-v9e0
OPTIONAL   -- Need OP ]],
    [[ rach-ConfigCommonSCell-r11           RACH-ConfigCommonSCell-r11
OPTIONAL,   -- Cond ULSCell
        prach-ConfigSCell-r11         PRACH-Config
OPTIONAL,   -- Cond UL
        tdd-Config-v1130              TDD-Config-v1130
OPTIONAL,   -- Cond TDD2
        uplinkPowerControlCommonSCell-v1130    UplinkPowerControlCommonSCell-
v1130 OPTIONAL   -- Cond UL ]],
    [[ pusch-ConfigCommon-v1270      PUSCH-ConfigCommon-v1270
OPTIONAL   -- Need OR ]],
    [[ pucch-ConfigCommon-r13        PUCCH-ConfigCommon
OPTIONAL,   -- Cond UL
        uplinkPowerControlCommonSCell-v131 UplinkPowerControlCommonSCell-
v1310 OPTIONAL   -- Cond UL ]],
    [[ highSpeedConfigSCell-r14      HighSpeedConfigSCell-r14
OPTIONAL,   -- Need OR
        prach-Config-v1430             PRACH-Config-v1430
OPTIONAL,   -- Cond UL
        ul-Configuration-r14           SEQUENCE {
            ul-FreqInfo-r14              SEQUENCE {
                ul-CarrierFreq-r14                  ARFCN-ValueEUTRA-r9
OPTIONAL,   -- Need OP
                ul-Bandwidth-r14            ENUMERATED {n6, n15, n25, n50,
n75, n100} OPTIONAL,  -- Need OP
                additionalSpectrumEmissionSCell-r14         AdditionalSpectrumEmission},
            p-Max-r14                  P-Max
OPTIONAL,   -- Need OP
            soundingRS-UL-ConfigCommon-r14         SoundingRS-UL-ConfigCommon,
            ul-CyclicPrefixLength-r14          UL-CyclicPrefixLength,
            prach-ConfigSCell-r14              PRACH-ConfigSCell-r10
OPTIONAL,   -- Cond TDD-OR-NoR11
            uplinkPowerControlCommonPUSCH-LessCell-
v1430
UplinkPowerControlCommonPUSCH-LessCell-v1430
OPTIONAL   -- Need OR}
OPTIONAL,   -- Cond ULSRS
        harq-ReferenceConfig-r14           ENUMERATED {sa2, sa4, sa5}
OPTIONAL,   -- Need OR
        soundingRS-FlexibleTiming-r14         ENUMERATED {true}
OPTIONAL   -- Need OR
```

| Structure #3 |
|---|

```
    ]],
    [[ mbsfn-SubframeConfigList-v1430         MBSFN-SubframeConfigList-
v1430    OPTIONAL -- Need ON]],
    [[ uplinkPowerControlCommonSCell-v1530    UplinkPowerControlCommon-
v1530    OPTIONAL --Need ON]]}
RadioResourceConfigCommonSCell-v1010 ::= SEQUENCE {
    -- UL configuration
    ul-Configuration-v1010           SEQUENCE {
        additionalSpectrumEmissionSCell-v1010        AdditionalSpectrumEmission-
v1010
    }
}
RadioResourceConfigCommonSCell-v1440 ::= SEQUENCE {
    ul-Configuration-v1440           SEQUENCE {
        ul-FreqInfo-v1440                SEQUENCE {
            additionalSpectrumEmissionSCell-v1440
    AdditionalSpectrumEmission-v1010
        }
    }
}
BCCH-Config ::=                      SEQUENCE {
    modificationPeriodCoeff          ENUMERATED {n2, n4, n8, n16}
}
BCCH-Config-v1310 ::=                SEQUENCE {
    modificationPeriodCoeff-v1310    ENUMERATED {n64}
}
FreqHoppingParameters-r13 ::=        SEQUENCE {
    dummy       ENUMERATED {nb2, nb4}         OPTIONAL,
    dummy2        CHOICE {
        interval-FDD-r13                 ENUMERATED {int1, int2, int4, int8},
        interval-TDD-r13                 ENUMERATED {int1, int5, int10,
int20}
    }                                                OPTIONAL,
    dummy3        CHOICE{
        interval-FDD-r13                 ENUMERATED {int2, int4, int8,
int16},
        interval-TDD-r13                 ENUMERATED { int5, int10, int20,
int40}
    }
                                                     OPTIONAL,
    interval-ULHoppingConfigCommonModeA-r13    CHOICE {
        interval-FDD-r13                 ENUMERATED {int1, int2, int4, int8},
        interval-TDD-r13                 ENUMERATED {int1, int5, int10,
int20}
    }               OPTIONAL, -- Cond MP-A
    interval-ULHoppingConfigCommonModeB-r13    CHOICE {
        interval-FDD-r13    ENUMERATED {int2, int4, int8, int16},
        interval-TDD-r13    ENUMERATED {int5, int10, int20, int40}
    }               OPTIONAL, -- Cond MP-B
    dummy4          INTEGER (1..maxAvailNarrowBands-r13)
    OPTIONAL }
PCCH-Config ::=                      SEQUENCE {
    defaultPagingCycle               ENUMERATED {rf32, rf64, rf128, rf256},
    nB                               ENUMERATED {
                                         fourT, twoT, oneT, halfT, quarterT,
                                    oneEighthT,oneSixteenthT, oneThirtySecondT}}
PCCH-Config-v1310 ::=                SEQUENCE {
    paging-narrowBands-r13           INTEGER (1..maxAvailNarrowBands-r13),
    mpdcch-NumRepetition-Paging-r13      ENUMERATED {r1, r2, r4, r8, r16, r32,
                                         r64, r128, r256},
    nB-v1310         ENUMERATED {one64thT, one128thT, one256thT}
    OPTIONAL   -- Need OR}
UL-CyclicPrefixLength ::=      ENUMERATED {len1, len2}
HighSpeedConfig-r14 ::=        SEQUENCE {
    highSpeedEnhancedMeasFlag-r14        ENUMERATED {true}
    OPTIONAL,   -- Need OR
    highSpeedEnhancedDemodulationFlag-r14   ENUMERATED {true}
    OPTIONAL   -- Need OR}
HighSpeedConfig-v1530 ::=      SEQUENCE {
    highSpeedMeasGapCE-ModeA-r15         ENUMERATED {true}}
HighSpeedConfigSCell-r14 ::=   SEQUENCE {
    highSpeedEnhancedDemodulationFlag-r14   ENUMERATED {true}
    OPTIONAL   -- Need OR}
```

Fields of Structures #1-3 are described in more detail below in Table 1:

TABLE 1

RadioResourceConfigCommon field descriptions additionalSpectrumEmissionSCell

The UE requirements related to additionalSpectrumEmissionSCell are defined in TS 36.101 [42]. E-UTRAN configures the same value in additionalSpectrumEmissionSCell for all SCell(s) of the same band with UL configured. The additionalSpectrumEmissionSCell is applicable for all serving cells (including PCell) of the same band with UL configured.

defaultPagingCycle

Default paging cycle, used to derive 'T' in TS 36.304 [4]. Value rf32 corresponds to 32 radio frames, rf64 corresponds to 64 radio frames and so on.

dummy

This field is not used in the specification. If received it shall be ignored by the UE.

harq-ReferenceConfig

Indicates UL/DL configuration used as the DL HARQ reference configuration for this serving cell. Value sa2 corresponds to Configuration2, sa4 to Configuration4 etc, as specified in TS 36.211 [21, table 4.2-2]. E-UTRAN configures the same value for all serving cells residing on same frequency band.

highSpeedEnhancedMeasFlag

If the field is present, the UE shall apply the high speed measurement enhancements as specified in TS 36.133 [16].

highSpeedEnhancedDemodulationFlag

If the field is present, the UE shall apply the advanced receiver in SFN scenario as specified in TS 36.101 [6].

highSpeedMeasGapCE-ModeA

If the field is present, the UE in CE mode A shall apply the measurement gap sharing table associated with high-velocity scenario for measurements, as specified in TS 36.133 [16].

interval-DLHoppingConfigCommonModeX

Number of consecutive absolute subframes over which MPDCCH or PDSCH for CE mode X stays at the same narrowband before hopping to another narrowband. For interval-FDD, int1 corresponds to 1 subframe, int2 corresponds to 2 subframes, and so on. For interval-TDD, int1 corresponds to 1 subframe, int5 corresponds to 5 subframes, and so on.

interval-ULHoppingConfigCommonModeX

Number of consecutive absolute subframes over which PUCCH or PUSCH for CE mode X stays at the same narrowband before hopping to another narrowband. For interval-FDD, int1 corresponds to 1 subframe, int2 corresponds to 2 subframes, and so on. For interval-TDD, int1 corresponds to 1 subframe, int5 corresponds to 5 subframes, and so on.

modificationPeriodCoeff

Actual modification period, expressed in number of radio frames= modificationPeriodCoeff * defaultPagingCycle. n2 corresponds to value 2, n4 corresponds to value 4, n8 corresponds to value 8, n16 corresponds to value 16, and n64 corresponds to value 64.

additionalSpectrumEmissionSCell

The UE requirements related to additionalSpectrumEmissionSCell are defined in TS 36.101 [42]. E-UTRAN configures the same value in additionalSpectrumEmissionSCell for all SCell(s) of the same band with UL configured. The additionalSpectrumEmissionSCell is applicable for all serving cells (including PCell) of the same band with UL configured.

mpdcch-NumRepetition-Paging

Maximum number of repetitions for MPDCCH common search space (CSS) for paging, see TS 36.211 [21].

mpdcch-pdsch-HoppingOffset

Parameter: $f^{\text{hop}}_{\text{offset}}$, see TS 36.211 [21, 6.4.1].

mpdcch-pdsch-HoppingNB

The number of narrowbands for MPDCCH/PDSCH frequency hopping. Value nb2 corresponds to 2 narrowbands and value nb4 corresponds to 4 narrowbands.

TABLE 1-continued

RadioResourceConfigCommon field descriptions nB

Parameter: nB is used as one of parameters to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on. In case nB-v1310 is signalled, the UE shall ignore nB (i.e. without suffix). EUTRAN configures nB-v1310 only in the BR version of SI message.

paging-narrowBands

Number of narrowbands used for paging, see TS 36.304 [4], TS 36.212 [22] and TS 36.213 [23].

p-Max

Pmax to be used in the target cell. If absent, for the band used in the target cell, the UE applies the maximum power according to its capability as specified in 36.101 [42, 6.2.2]. In case the UE is configured with uplink intra-band contiguous CA and the UE indicates ue-CA-PowerClass-N in that band combination, then the p-Max in RadioResourceConfigCommonSCell for that SCell, if present, also applies for that band combination whenever that SCell is activated.

prach-ConfigSCell

Indicates a PRACH configuration for an SCell. The field is not applicable for an LAA SCell in this release.

rach-ConfigCommonSCell

Indicates a RACH configuration for an SCell. The field is not applicable for an LAA SCell in this release.

soundingRS-FlexibleTiming

Indicates the SRS flexible timing (if configured) for aperiodic SRS triggered by DL grant. If the SRS transmission is collided with ACK/NACK, postpone once to the next configured SRS transmission opportunity.

additionalSpectrumEmissionSCell

The UE requirements related to additionalSpectrumEmissionSCell are defined in TS 36.101 [42]. E-UTRAN configures the same value in additionalSpectrumEmissionSCell for all SCell(s) of the same band with UL configured. The additionalSpectrumEmissionSCell is applicable for all serving cells (including PCell) of the same band with UL configured.

ul-Bandwidth

Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.

ul-CarrierFreq

For FDD: If absent, the (default) value determined from the default TX-RX frequency separation defined in TS 36.101 [42, table 5.7.3-1] applies.
For TDD: This parameter is absent and it is equal to the downlink frequency.

ul-CyclicPrefixLength

Parameter: Uplink cyclic prefix length see TS 36.211 [21, 5.2.1] where len1 corresponds to normal cyclic prefix and len2 corresponds to extended cyclic prefix.

Table 2 describes the meaning of conditional parameters of structures #1-3.

TABLE 2

| Conditional presence | Explanation |
| --- | --- |
| EDT | The field is optionally present, Need OR, if edt-Parameters is present; otherwise the field is not present and the UE shall delete any existing value for this field. |
| MP-A | The field is mandatory present for CE mode A. Otherwise the field is optional, Need OR. |
| MP-B | The field is mandatory present for CE mode B. Otherwise the field is optional, Need OR. |
| TDD | The field is optional for TDD, Need ON; it is not present for FDD and the UE shall delete any existing value for this field. |

TABLE 2-continued

| Conditional presence | Explanation |
| --- | --- |
| TDD2 | If tdd-Config-r10 is present, the field is optional, Need OR. Otherwise the field is not present and the UE shall delete any existing value for this field. |
| TDD3 | If tdd-Config is present, the field is optional, Need OR. Otherwise the field is not present and the UE shall delete any existing value for this field. |
| TDD-OR-NoR11 | If prach-ConfigSCell-r11 is absent, the field is optional for TDD, Need OR. Otherwise the field is not present and the UE shall delete any existing value for this field. |
| TDDSCell | This field is mandatory present for TDD; it is not present for FDD and LAA SCell, and the UE shall delete any existing value for this field. |
| UL | If the SCell is part of the STAG or concerns the PSCell or PUCCH SCell and if ul-Configuration is included, the field is optional, Need OR. Otherwise the field is not present and the UE shall delete any existing value for this field. |
| ULSCell | For the PSCell (IE is included in RadioResourceConfigCommonPSCell) the field is absent. Otherwise, if the SCell is part of the STAG and if ul-Configuration is included, the field is optional, Need OR. Otherwise the field is not present and the UE shall delete any existing value for this field. |
| ULSRS | If ul-Configuration-r10 is absent, the field is optional, Need OR. Otherwise the field is not present and the UE shall delete any existing value for this field. |

The UE-EUTRA-Capability IE is used to convey the E-UTRA UE Radio Access Capability Parameters (see e.g., 3GPP TS 36.306) and the Feature Group Indicators for mandatory features to the network. The UE-EUTRA-Capability IE is transferred in E-UTRA or in another RAT. Structure #4 shows the definition of the UE-EUTRA-Capability IE.

| Structure #4 |
| --- |
| UE-EUTRA-Capability ::=    SEQUENCE {<br>  accessStratumRelease    Access StratumRelease,<br>  ue-Category    INTEGER (1..5),<br>  pdcp-Parameters    PDCP-Parameters,<br>  phyLayerParameters    PhyLayerParameters,<br>  rf-Parameters    RF-Parameters,<br>  measParameters    MeasParameters,<br>  featureGroupIndicators    BIT STRING (SIZE (32)) OPTIONAL,<br>  interRAT-Parameters    SEQUENCE {<br>    utraFDD    IRAT-ParametersUTRA-FDD OPTIONAL,<br>    utraTDD128    IRAT-ParametersUTRA-TDD128 OPTIONAL,<br>    utraTDD384    IRAT-ParametersUTRA-TDD384 OPTIONAL,<br>    utraTDD768    IRAT-ParametersUTRA-TDD768 OPTIONAL,<br>    geran    IRAT-ParametersGERAN OPTIONAL,<br>    cdma2000-HRPD    IRAT-ParametersCDMA2000-HRPD OPTIONAL,<br>    cdma2000-1xRTT    IRAT-ParametersCDMA2000-1XRTT OPTIONAL},<br>  nonCriticalExtension    UE-EUTRA-Capability-v920-IEs OPTIONAL}<br>[...]<br>HighSpeedEnhParameters-r14 ::= SEQUENCE {<br>  measurementEnhancements-r14    ENUMERATED {supported} OPTIONAL,<br>  demodulationEnhancements-r14    ENUMERATED {supported} OPTIONAL,<br>  prach-Enhancements-r14    ENUMERATED {supported } OPTIONAL<br>} |

Fields of Structure #4 are described in more detail below in Table 3:

TABLE 3

UE-EUTRA-Capability field descriptions measurementEnhancements

This field defines whether UE supports measurement enhancements in high speed scenario as specified in TS 36.133 [16].

The NAS 857 may form the highest stratum of the control plane between the UE 101 and the AMF XR221. The NAS 857 may support the mobility of the UEs 101 and the session management procedures to establish and maintain IP connectivity between the UE 101 and a P-GW in LTE systems.

Figure 10:
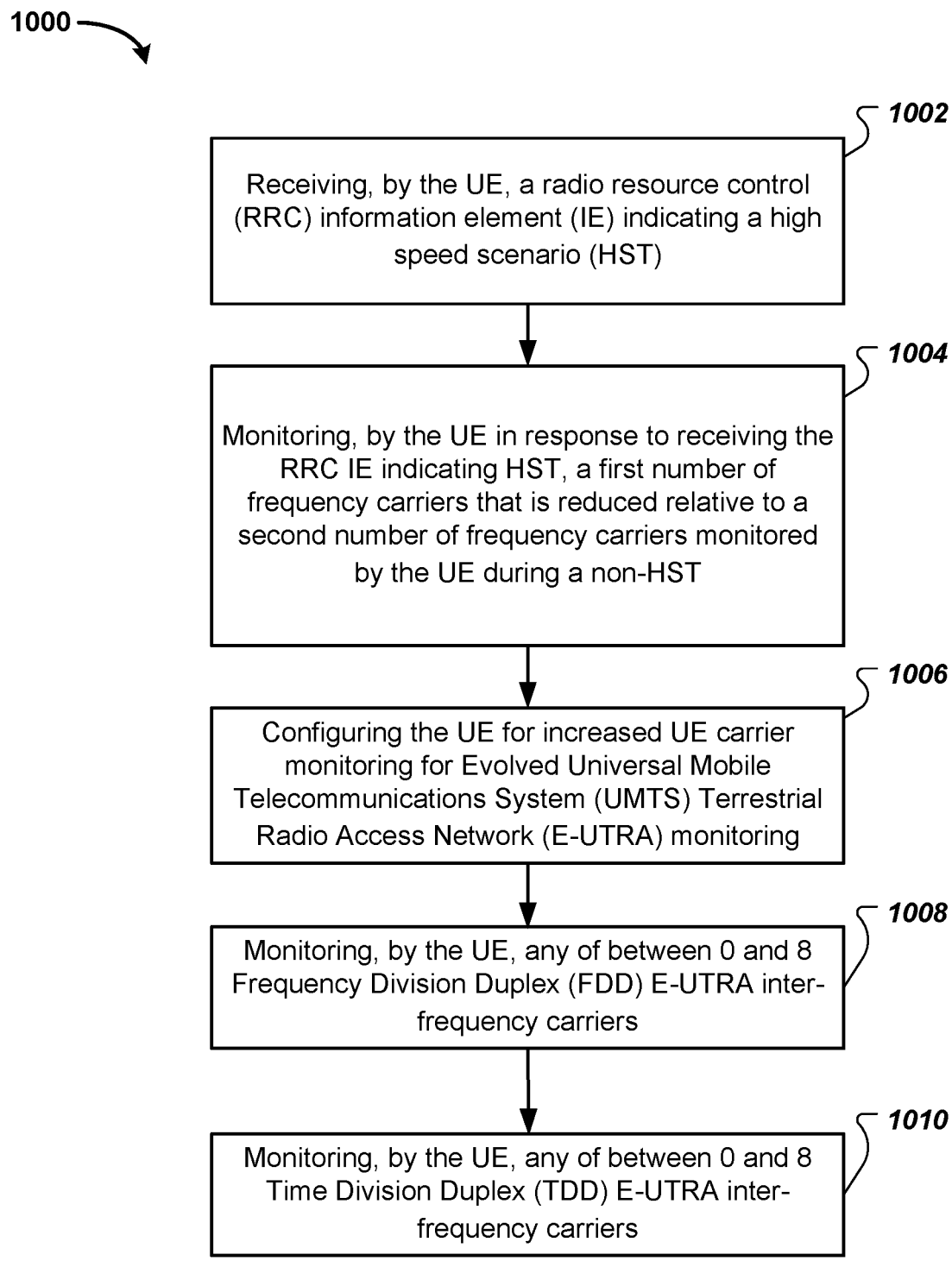
FIGS. 10-12 illustrate example processes for configuring UE measurement capability in high speed scenarios.
Figure 11:
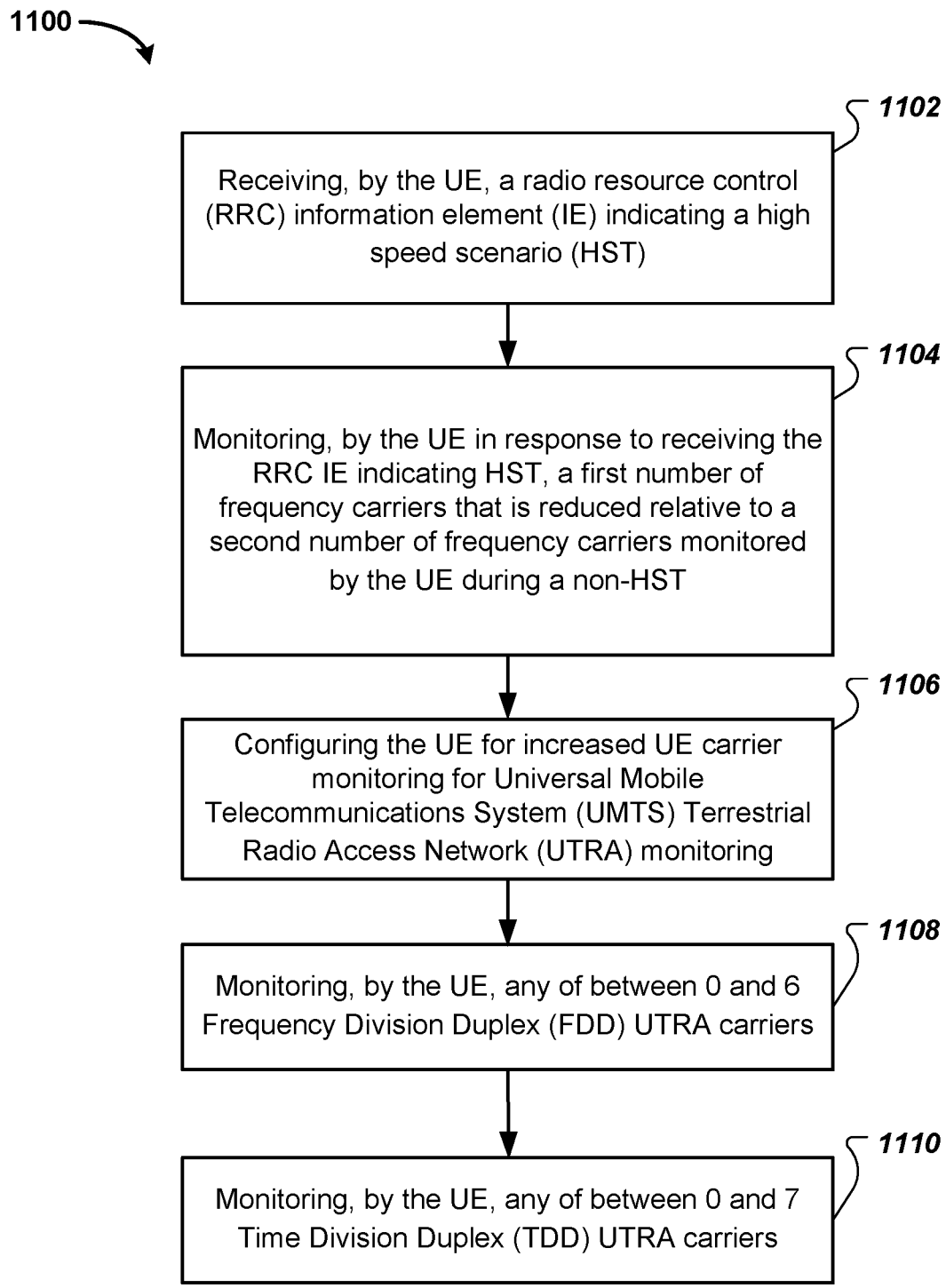
Figure 12:
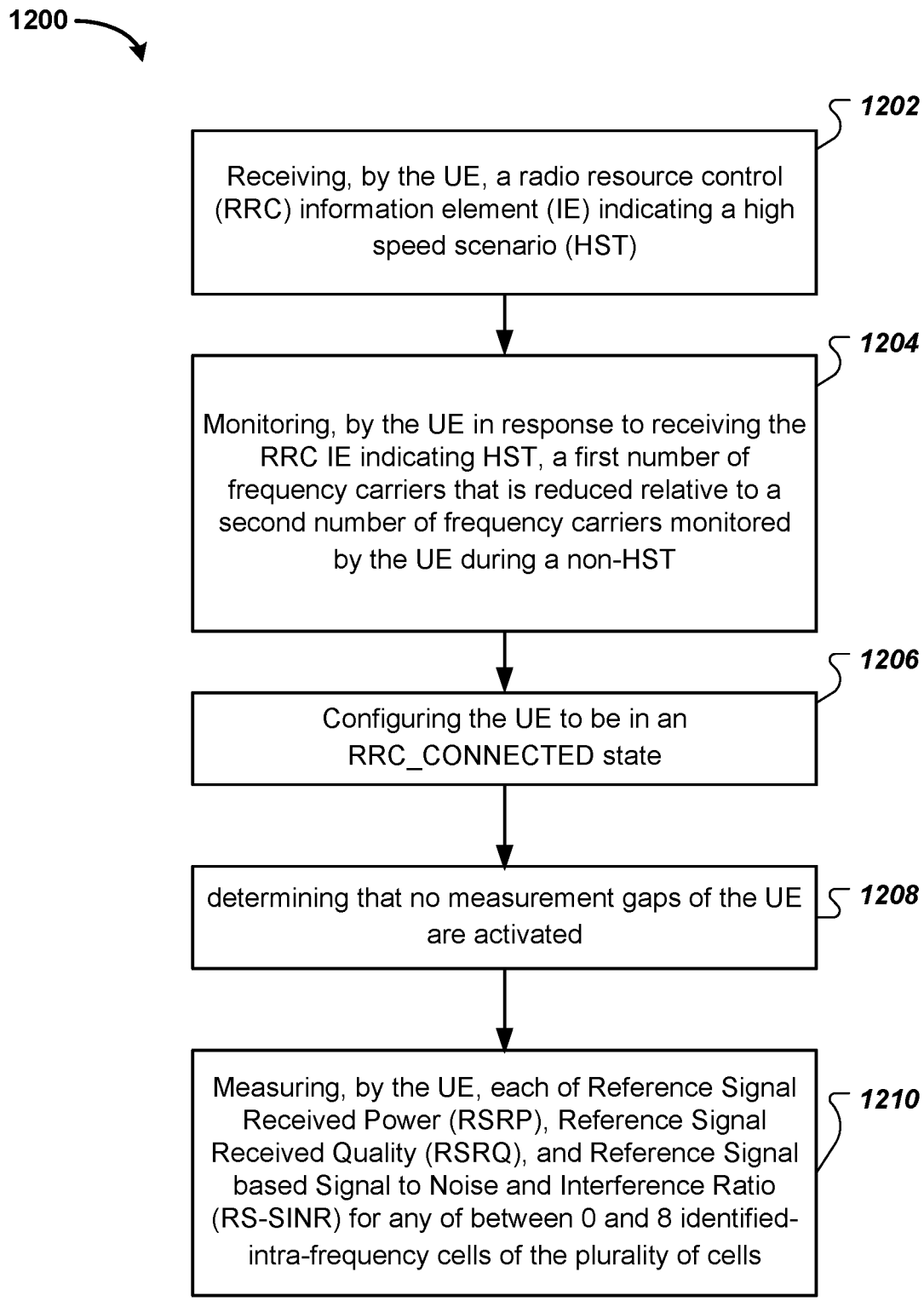

Turning to FIGS. 10-12, flow diagrams are shown illustrating processes for configuring UE measurement capabilities in HST. Most LTE UEs can support "Increased UE carrier monitoring E-UTRA" (IncMon). Generally, the HST indicator can include a highSpeedEnhancedMeasFlag, or SCC measurementEnhancements, or any other IE which is used to indicate UE is in high speed scenario. Once UE supports increased UE carrier monitoring E-UTRA in the high speed scenario, the number of the frequency carriers that UE need to monitor can be reduced.

In some implementations, when HST is indicated, the UE (e.g., UE 101 of FIG. 1), which indicates support for Increased UE carrier monitoring E-UTRA, is capable of monitoring at least one of the following. The UE monitors, depending on UE capability, between 0 and 8 FDD E-UTRA inter-frequency carriers and between 0 and 8 TDD E-UTRA inter-frequency carriers.

In some implementations, when HST is indicated, the UE which indicates support for increased UE carrier monitoring UTRA is capable of monitoring at least one of the following. The UE monitors, depending on UE capability, between 0 and 6 UTRA carriers and between 0 and 7 TDD UTRA carriers.

Here there are two cases where the UE measurement capability could be modified for high speed scenarios. First, in some implementations, when the UE is in the RRC_CONNECTED state when HST is indicated, and when no measurement gaps are activated, the UE is capable of performing RSRP, RSRQ, and/or RS-SINR measurements for between 0 and 8 identified-intra-frequency cells. This is for the requirements on intra frequency measurement in 3GPP TS 38.133 section 8.1.2.2.1.1 (and/or 3GPP TS 36.133 section 8.1.2.2.1.1), where it is stated as "When no measurement gaps are activated, the UE shall be capable of performing RSRP, RSRQ, and RS-SINR measurements for 8 identified-intra-frequency cells."

Second, in some implementations, when HST is indicated, the UE is capable of performing RSRP, RSRQ, and/or RS-SINR measurements for between 0 and 8 identified cells on a secondary component carrier. This configuration is for the requirements on intra frequency measurement in 3GPP TS 38.133 section 8.3.3.2.1 (and/or 3GPP TS 36.133 section 8.3.3.2.1) where it is stated as "The UE shall be capable of performing RSRP, RSRQ, and RS-SINR measurements for 8 identified cells on a secondary component carrier."

In some implementations, when HST is indicated, the UE which supports increased UE carrier monitoring E-UTRA is capable of performing RSRP, RSRQ, and/or RS-SINR measurements of at least between 0 and 4 inter-frequency cells per FDD inter-frequency for up to between 0-8 FDD inter-frequencies. When HST is indicated, the UE which does not support increased UE carrier monitoring E-UTRA is capable of performing RSRP, RSRQ, and/or RS-SINR measurements of at least between 0 and 4 inter-frequency cells per FDD inter-frequency for up to between 0 and 4 FDD inter-frequencies. This configuration corresponds to 3GPP TS 38.133 section 8.1.2.3.1.1 (and/or 3GPP TS 36.133 section 8.1.2.3.1.1) where it is stated as "The UE shall be capable of performing RSRP, RSRQ, and RS-SINR measurements of at least 4 inter-frequency cells per FDD inter-frequency for up to 3 FDD inter-frequencies or 8 FDD inter-frequencies if the UE supports Increased UE carrier monitoring E-UTRA."

Turning to FIG. 10, process 1000 for configuring UE for measurement capability in high speed scenarios is shown. Process 1000 can be performed in a communication system comprising UE and RAN described above in relation to FIGS. 1-9. In process 1000, the UE is configured to receive (1002), a radio resource control (RRC) information element IE) indicating a high speed scenario (HST). The UE is configured to monitor (1004), in response to receiving the RRC IE indicating HST, a first number of frequency carriers that is reduced relative to a second number of frequency carriers monitored by the UE during a non-HST. The UE is configured (1006) for increased UE carrier monitoring for Evolved Universal Mobile Telecommunications System (UMTS) Terrestrial Radio Access Network (E-UTRA) monitoring. The UE monitors (1008) any of between 0 and 8 Frequency Division Duplex (FDD) E-UTRA inter-frequency carriers. The UE monitors (1010) any of between 0 and 8 Time Division Duplex (TDD) E-UTRA inter-frequency carriers.

Turning to FIG. 11, process 1100 for configuring UE for measurement capability in high speed scenarios is shown. Process 1100 can be performed in a communication system comprising UE and RAN described above in relation to FIGS. 1-9. In process 1100, the UE is configured to receive (1102), a radio resource control (RRC) information element IE) indicating a high speed scenario (HST). The UE is configured to monitor (1104), in response to receiving the RRC IE indicating HST, a first number of frequency carriers that is reduced relative to a second number of frequency carriers monitored by the UE during a non-HST. The UE is configured (1106) for increased UE carrier monitoring for Universal Mobile Telecommunications System (UMTS) Terrestrial Radio Access Network (UTRA) monitoring. The UE monitors (1108) any of between 0 and 6 Frequency Division Duplex (FDD) UTRA carriers. The UE monitors (1110) any of between 0 and 7 Time Division Duplex (TDD) UTRA carriers.

Turning to FIG. 12, process 1200 for configuring UE for measurement capability in high speed scenarios is shown. Process 1200 can be performed in a communication system comprising UE and RAN described above in relation to FIGS. 1-9. In process 1200, the UE is configured to receive (1202), a radio resource control (RRC) information element IE) indicating a high speed scenario (HST). The UE is configured to monitor (1204), in response to receiving the RRC IE indicating HST, a first number of frequency carriers that is reduced relative to a second number of frequency carriers monitored by the UE during a non-HST. The UE is configured (1206) to be in an RRC_CONNECTED state. The UE determines (1208) that no measurement gaps of the UE are activated. The UE, in response to determining that no measurement gaps of the UE are activated, measures (1210) each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

In some implementations, the UE measures each of Reference Signal Received Power (RSRP), Reference Signal Received Quality (RSRQ), and Reference Signal based Signal to Noise and Interference Ratio (RS-SINR) for any of between 0 and 8 identified cells of the plurality of cells. Each of the RSRP, RSRQ, and RS-SINR are measured on a secondary component carrier. In some implementations, the UE measures each of RSRP, RSRQ, and RS-SINR of at least between 0 to 4 inter-frequency cells per FDD inter-frequency for any of between 0 and 8 FDD inter-frequencies.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving a radio resource control (RRC) information element (IE) indicating a high speed scenario (HST);
    monitoring, in response to receiving the RRC IE indicating HST, a first number of frequency carriers that is reduced relative to a second number of frequency carriers monitored during a non-HST; and
    wherein monitoring the first number of frequency carriers comprises:
        measuring each of Reference Signal Received Power (RSRP), Reference Signal Received Quality (RSRQ), and Reference Signal based Signal to Noise and Interference Ratio (RS-SINR) for any of between 0 and 8 identified cells of a plurality of cells in a radio access network (RAN), wherein each of the RSRP, RSRQ, and RS-SINR are measured on a secondary component carrier.

2. The method of claim 1, wherein monitoring the first number of frequency carriers comprises:
    configuring a user equipment (UE) for increased UE carrier monitoring for Evolved Universal Mobile Telecommunications System (UMTS) Terrestrial Radio Access Network (E-UTRA) monitoring;
    monitoring any of between 0 and 8 Frequency Division Duplex (FDD) E-UTRA inter-frequency carriers; and
    monitoring any of between 0 and 8 Time Division Duplex (TDD) E-UTRA inter-frequency carriers.

3. The method of claim 1, wherein monitoring the first number of frequency carriers comprises:
    configuring a user equipment (UE) for increased UE carrier monitoring for Universal Mobile Telecommunications System (UMTS) Terrestrial Radio Access Network (UTRA) monitoring;
    monitoring any of between 0 and 6 Frequency Division Duplex (FDD) UTRA carriers; and
    monitoring any of between 0 and 7 Time Division Duplex (TDD) UTRA carriers.

4. The method of claim 1, wherein monitoring the first number of frequency carriers comprises:
    configuring a user equipment (UE) to be in an RRC_CONNECTED state;
    determining that no measurement gaps of the UE are activated; and in response to determining that no measurement gaps of the UE are activated, measuring each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

5. The method of claim 1, wherein monitoring the first number of frequency carriers comprises:
configuring a user equipment (UE) for increased UE carrier monitoring for E-UTRA monitoring; and
measuring each of RSRP, RSRQ, and RS-SINR of at least between 0 to 4 inter-frequency cells per FDD inter-frequency for any of between 0 and 8 FDD inter-frequencies.

6. The method of claim 1, wherein monitoring the first number of frequency carriers comprises:
determining that a user equipment (UE) does not support Increased UE carrier monitoring E-UTRA; and
measuring each of RSRP, RSRQ, and RS-SINR of at least between 0 to 4 inter-frequency cells per FDD inter-frequency for any of between 0 and 4 FDD inter-frequencies.

7. The method of claim 1, wherein a user equipment (UE) that receives the RRC IE is configured by a next generation (gNB) node of the RAN by the RRC IE.

8. The method of claim 1, wherein the RRC IE comprises one of a highSpeedEnhancedMeasFlag or Secondary Component Carrier (SCC) measurementEnhancements for indicating HST.

9. The method of claim 1, further comprising:
configuring a user equipment (UE) to identify new intra-frequency cells and perform RSRP, RSRQ, and RS-SINR measurements of identified intra-frequency cells without an explicit intra-frequency neighbor cell list containing physical layer cell identities; and
configuring the UE to measure, during an RRC_CONNECTED state, identified intra frequency cells and additionally search for and identify the new intra frequency cells.

10. An apparatus comprising:
one or more processors;
a memory storing instructions that, when executed by the one or more processors, cause the one or more processors to perform operations comprising:
receiving a radio resource control (RRC) information element (IE) indicating a high speed scenario (HST);
monitoring, by the one or more processors, in response to receiving the RRC IE indicating HST, a first number of frequency carriers that is reduced relative to a second number of frequency carriers monitored during a non-HST; and
wherein monitoring the first number of frequency carriers comprises:
measuring each of Reference Signal Received Power (RSRP), Reference Signal Received Quality (RSRQ), and Reference Signal based Signal to Noise and Interference Ratio (RS-SINR) for any of between 0 and 8 identified cells of a plurality of cells of a radio access network (RAN), wherein each of the RSRP, RSRQ, and RS-SINR are measured on a secondary component carrier.

11. The apparatus of claim 10, wherein monitoring the first number of frequency carriers comprises:
configuring the one or more processors to perform increased UE carrier monitoring for Evolved Universal Mobile Telecommunications System (UMTS) Terrestrial Radio Access Network (E-UTRA) monitoring;
monitoring, by the one or more processors, any of between 0 and 8 Frequency Division Duplex (FDD) E-UTRA inter-frequency carriers; and
monitoring, by the one or more processors, any of between 0 and 8 Time Division Duplex (TDD) E-UTRA inter-frequency carriers.

12. The apparatus of claim 10, wherein monitoring the first number of frequency carriers comprises:
configuring the one or more processors to perform increased UE carrier monitoring for Universal Mobile Telecommunications System (UMTS) Terrestrial Radio Access Network (UTRA) monitoring;
monitoring, by the one or more processors, any of between 0 and 6 Frequency Division Duplex (FDD) UTRA carriers; and
monitoring, by the one or more processors, any of between 0 and 7 Time Division Duplex (TDD) UTRA carriers.

13. The apparatus of claim 10, wherein monitoring the first number of frequency carriers comprises:
configuring the one or more processors to be in an RRC_CONNECTED state;
determining that no measurement gaps and the one or more processors are activated; and
in response to determining that no measurement gaps are activated, measuring, by the one or more processors, each of Reference Signal Received Power (RSRP), Reference Signal Received Quality (RSRQ), and Reference Signal based Signal to Noise and Interference Ratio (RS-SINR) for any of between 0 and 8 identified-intra-frequency cells of the plurality of cells.

14. The apparatus of claim 10, wherein monitoring the first number of frequency carriers comprises:
configuring the one or more processors for increased UE carrier monitoring for E-UTRA monitoring; and
measuring, by the one or more processors, each of RSRP, RSRQ, and RS-SINR of at least between 0 to 4 inter-frequency cells per FDD inter-frequency for any of between 0 and 8 FDD inter-frequencies.

15. The apparatus of claim 10, wherein monitoring the first number of frequency carriers comprises:
determining that the one or more processors does not support increased UE carrier monitoring E-UTRA; and
measuring, by the one or more processors, each of RSRP, RSRQ, and RS-SINR of at least between 0 to 4 inter-frequency cells per FDD inter-frequency for any of between 0 and 4 FDD inter-frequencies.

16. The apparatus of claim 10, wherein the one or more processors are configured by a next generation (gNB) node of the RAN by the RRC IE.

17. The apparatus of claim 10, wherein the RRC IE comprises one of a highSpeedEnhancedMeasFlag or Secondary Component Carrier (SCC) measurementEnhancements for indicating HST.

18. A non-transitory computer-readable medium storing software comprising instructions executable by one or more processors which, upon such execution, cause the one or more processors to perform operations comprising:
receiving a radio resource control (RRC) information element (IE) indicating a high speed scenario (HST);
monitoring, by the one or more processors, in response to receiving the RRC IE indicating HST, a first number of frequency carriers that is reduced relative to a second number of frequency carriers monitored during a non-HST; and wherein monitoring the first number of frequency carriers comprises:

measuring each of Reference Signal Received Power (RSRP), Reference Signal Received Quality (RSRQ), and Reference Signal based Signal to Noise and Interference Ratio (RS-SINR) for any of between 0 and 8 identified cells of a plurality of cells of a radio access network (RAN), wherein each of the RSRP, RSRQ, and RS-SINR are measured on a secondary component carrier.

* * * * *